(12) United States Patent
Zionts et al.

(10) Patent No.: US 12,461,968 B2
(45) Date of Patent: Nov. 4, 2025

(54) INFRASTRUCTURE FOR QUERYABLE SUPERGRAPH SUBSET REPRESENTATIONS

(71) Applicant: Apollo Graph, Inc., San Francisco, CA (US)

(72) Inventors: Adam Samuel Zionts, Fort Lauderdale, FL (US); Joshua Rohan Segaran, San Francisco, CA (US); Sachin Dilip Shinde, San Francisco, CA (US); David Andres Castaneda, Miami, FL (US); Geoffroy Pierre Alexis Carrier, Toronto (CA); Joseph Conor McCarron, Elgin, TX (US); Joel Thomas Burton, St. Louis, MO (US); Caydie Tran, Oakland, CA (US); Parul Schroff, San Francisco, CA (US); Timothy Michael Hingston, South Golden Beach (AU)

(73) Assignee: Apollo Graph, Inc., San Francisco, CA (US)

( * ) Notice: Subject to any disclaimer, the term of this patent is extended or adjusted under 35 U.S.C. 154(b) by 87 days.

(21) Appl. No.: 17/738,677

(22) Filed: May 6, 2022

(65) Prior Publication Data

US 2023/0359667 A1 Nov. 9, 2023

(51) Int. Cl.
*G06F 16/901* (2019.01)

(52) U.S. Cl.
CPC ................................ *G06F 16/9024* (2019.01)

(58) Field of Classification Search
None
See application file for complete search history.

(56) References Cited

U.S. PATENT DOCUMENTS

| | | | |
|---|---|---|---|
| 2004/0080549 A1* | 4/2004 | Lord | G06F 16/30 707/E17.058 |
| 2012/0209886 A1* | 8/2012 | Henderson | G06F 16/9024 707/E17.011 |
| 2015/0169758 A1* | 6/2015 | Assom | G06F 16/36 707/603 |
| 2018/0329958 A1* | 11/2018 | Choudhury | G06F 16/2456 |
| 2019/0384926 A1* | 12/2019 | Wu | G06F 21/604 |
| 2022/0398331 A1* | 12/2022 | Karlberg | G06F 16/9035 |

* cited by examiner

*Primary Examiner* — Tony Mahmoudi
*Assistant Examiner* — Umar Mian
(74) *Attorney, Agent, or Firm* — Berkeley Law & Technology Group, LLP

(57) ABSTRACT

The present disclosure relates generally to infrastructure for queryable supergraph subset representations. Briefly, in at least one implementations, an apparatus may comprise at least one processor of at least one computing device to obtain a source graph schema, obtain an input from a user, wherein the input from the user to at least specify one or more filters, generate one or more subset representations of the source graph schema based at least in part on the specified one or more filters, and provide access to the one or more subset representations of the source graph schema for one or more particular entities and deny access to one or more aspects of the source graph schema absent from the one or more subset representations for the one or more particular entities.

20 Claims, 14 Drawing Sheets

INFRASTRUCTURE FOR QUERYABLE SUPERGRAPH SUBSET REPRESENTATIONS

BACKGROUND

Field

The present disclosure relates generally to computing and/or communications infrastructure and, more particularly, infrastructure for queryable supergraph subset representations.

Information

The Internet is widespread. The World Wide Web or simply the Web, provided by the Internet, is growing rapidly, at least in part, from the large amount of content being added seemingly on a daily basis. A wide variety of content in the form of stored signals, such as, for example, text files, images, audio files, video files, web pages, measurements of physical phenomena, and/or the like may be continually acquired, identified, located, retrieved, collected, stored, communicated, etc. Increasingly, content is being acquired, collected, communicated, etc. by a number of electronic devices, such as, for example, embedded computing devices leveraging existing Internet and/or like infrastructure as part of a so-called "Internet of Things" (IoT), such as via a variety of protocols, domains, and/or applications. IoT may typically comprise a system of interconnected and/or internet worked physical computing devices capable of being identified, such as uniquely via an assigned Internet Protocol (IP) address, for example. Devices, such as IoT-type devices, for example, may include computing resources embedded into hardware so as to facilitate and/or support a device's ability to acquire, collect, process and/or transmit content over one or more communications networks. IoT-type devices, for example, may comprise a wide variety of embedded devices, such as, for example, automobile sensors, biochip transponders, heart monitoring implants, thermostats, kitchen appliances, locks or like fastening devices, solar panel arrays, home gateways, controllers, and/or the like.

In some instances, challenges may be faced in improving performance of communications between and/or among IoT-type devices and/or other electronic device types, for example. An aspect of communications related to IoT-type devices and/or other electronic device types, for example, may involve processing of one or more queries that may be generated at IoT-type devices and/or other electronic device types.

BRIEF DESCRIPTION OF THE DRAWINGS

Claimed subject matter is particularly pointed out and distinctly claimed in the concluding portion of the specification. However, both as to organization and/or method of operation, together with objects, features, and/or advantages thereof, it may best be understood by reference to the following detailed description if read with the accompanying drawings in which:

Figure 1:
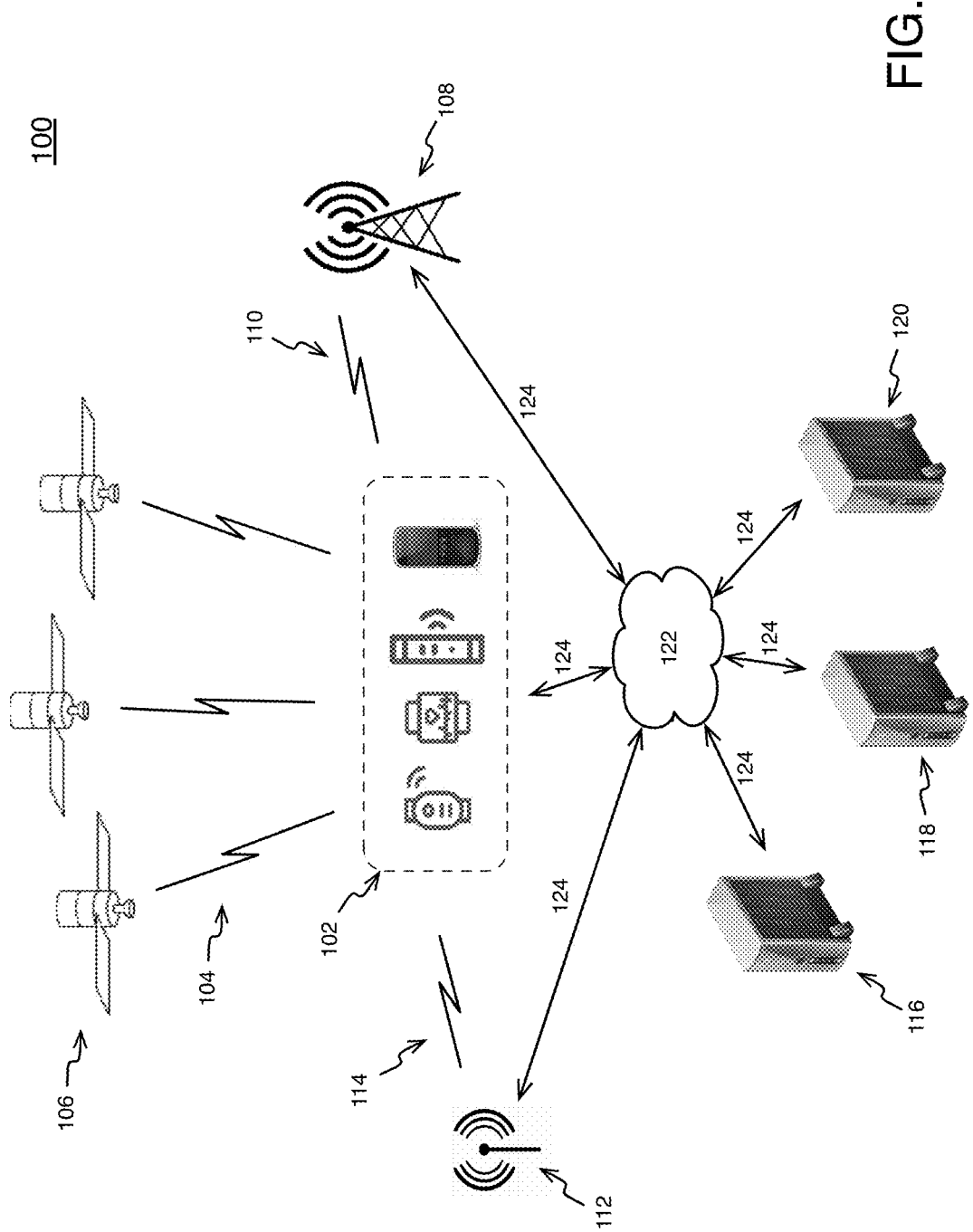
FIG. 1 is a schematic block diagram depicting an embodiment of an example system including one or more server computing devices and/or one or more client computing devices.

Reference is made in the following detailed description to accompanying drawings, which form a part hereof, wherein like numerals may designate like parts throughout that are corresponding and/or analogous. It will be appreciated that the figures have not necessarily been drawn to scale, such as for simplicity and/or clarity of illustration. For example, dimensions of some aspects may be exaggerated relative to others. Further, it is to be understood that other embodiments may be utilized. Furthermore, structural and/or other changes may be made without departing from claimed subject matter. References throughout this specification to "claimed subject matter" refer to subject matter intended to be covered by one or more claims, or any portion thereof, and are not necessarily intended to refer to a complete claim set, to a particular combination of claim sets (e.g., method claims, apparatus claims, etc.), or to a particular claim. It should also be noted that directions and/or references, for example, such as up, down, top, bottom, and so on, may be used to facilitate discussion of drawings and are not intended to restrict application of claimed subject matter. Therefore, the following detailed description is not to be taken to limit claimed subject matter and/or equivalents.

DETAILED DESCRIPTION

References throughout this specification to one implementation, an implementation, one embodiment, an embodiment, and/or the like means that a particular feature, structure, characteristic, and/or the like described in relation to a particular implementation and/or embodiment is included in at least one implementation and/or embodiment of claimed subject matter. Thus, appearances of such phrases, for example, in various places throughout this specification are not necessarily intended to refer to the same implementation and/or embodiment or to any one particular implementation and/or embodiment. Furthermore, it is to be understood that particular features, structures, characteristics, and/or the like described are capable of being combined in various ways in one or more implementations and/or embodiments and, therefore, are within intended claim scope. In general, of course, as has always been the case for the specification of a patent application, these and other issues have a potential to vary in a particular context of usage. In other words, throughout the patent application, particular context of description and/or usage provides helpful guidance regarding reasonable inferences to be drawn; however, likewise, "in this context" in general without further qualification refers to the context of the present patent application.

As mentioned above, the World Wide Web or simply the Web, provided by the Internet, is growing rapidly, at least in part, from the large amount of content being added seemingly on a daily basis. A wide variety of content in the form of stored signals, such as, for example, text files, images, audio files, video files, web pages, measurements of physical phenomena, and/or the like may be continually acquired, identified, located, retrieved, collected, stored, communicated, etc. Increasingly, content is being acquired, collected, communicated, etc. by a number of electronic devices, such as, for example, embedded computing devices leveraging existing Internet and/or like infrastructure as part of a so-called "Internet of Things" (IoT), such as via a variety of protocols, domains, and/or applications. IoT may typically comprise a system of interconnected and/or internet worked physical computing devices capable of being identified, such as uniquely via an assigned Internet Protocol (IP) address, for example. Devices, such as IoT-type devices, for example, may include computing resources embedded into hardware so as to facilitate and/or support a device's ability to acquire, collect, process and/or transmit content over one or more communications networks. In this context, "IoT-type devices" and/or the like refer to one or more electronic and/or computing devices capable of leveraging existing Internet and/or like infrastructure as part of the IoT, such as via a variety of applicable protocols, domains, applications, etc. In particular implementations, IoT-type devices, for example, may comprise a wide variety of embedded devices, such as, for example, automobile sensors, biochip transponders, heart monitoring implants, thermostats, kitchen appliances, locks or like fastening devices, solar panel arrays, home gateways, controllers, and/or the like. Although embodiments described herein may refer to IoT-type devices, claimed subject matter is not limited in scope in these respects. For example, although IoT-type devices may be described, claimed subject matter is intended to include use of any of a wide range of electronic device types, including a wide range of computing device types.

In some instances, challenges may be faced in improving performance of communications between and/or among one or more IoT-type devices and/or one or more other electronic device types (e.g., between one or more server computing devices and one or more computing devices). An aspect of communications related to client computing devices, such as IoT-type devices and/or other electronic device types, for example, may involve processing of one or more queries that may be generated at client computing devices and/or other electronic device types.

"Electronic content," "content" and/or the like as the terms are used herein should be interpreted broadly and refers to signals, such signal packets, for example, and/or states, such as physical states on a memory device, for example, but otherwise are employed in a manner irrespective of format, such as any expression, representation, realization, and/or communication, for example. Content may comprise, for example, any information, knowledge, and/or experience, such as, again, in the form of signals and/or states, physical or otherwise. In this context, "electronic" or "on-line" content refers to content in a form that although not necessarily capable of being perceived by a human, (e.g., via human senses, etc.) may nonetheless be transformed into a form capable of being so perceived, such as visually, haptically, and/or audibly, for example. Non-limiting examples may include text, audio, images, video, security parameters, schema elements, combinations, or the like. Thus, content may be stored and/or transmitted electronically, such as before or after being perceived by human senses. In general, it may be understood that electronic content may be intended to be referenced in a particular discussion, although in the particular context, the term "content" may be employed for ease of discussion. Specific examples of content may include, for example, computer code, data, metadata, message, text, audio file, video file, data file, web page, graph schema, or the like. Claimed subject matter is not intended to be limited to these particular examples, of course.

FIG. 1 is a schematic diagram illustrating features associated with an implementation of an example operating environment 100 capable of facilitating and/or supporting one or more operations, processes, techniques, approaches, etc. for infrastructure for queryable supergraph subset representations, illustrated generally herein at 102. It should be appreciated that operating environment 100 is described herein as a non-limiting example that may be implemented, in whole or in part, in a context of various wired and/or wireless communications networks and/or any suitable portion and/or combination of such networks. For example, these or like networks may include one or more public networks (e.g., the Internet, the World Wide Web), private networks (e.g., intranets), wireless wide area networks (WWAN), wireless local area networks (WLAN, etc.), wireless personal area networks (WPAN), telephone networks, cable television networks, Internet access networks, fiber-optic communication networks, waveguide communication networks and/or the like. It should also be noted that claimed subject matter is not limited to a particular network and/or operating environment. Thus, for a particular implementation, one or more operations, processes, techniques, approaches, etc. for queryable supergraph subset representations may be performed, at least in part, in an indoor environment and/or an outdoor environment, or any combination thereof.

Thus, as illustrated, in a particular implementation, one or more client computing devices 102, such as IoT-type devices, may, for example, receive and/or acquire satellite positioning system (SPS) signals 104 from SPS satellites 106. In some instances, SPS satellites 106 may be from a single global navigation satellite system (GNSS), such as the GPS or Galileo satellite systems, for example. In other instances, SPS satellites 106 may be from multiple GNSS such as, but not limited to, GPS, Galileo, Glonass, or Beidou (Compass) satellite systems, for example. In certain implementations, SPS satellites 1006 may be from any one several regional navigation satellite systems (RNSS) such as, for example, WAAS, EGNOS, QZSS, just to name a few examples.

At times, one or more client computing devices 102 may, for example, transmit wireless signals to and/or receive wireless signals from a suitable wireless communication network. In one example, one or more client computing devices 102 may communicate with a cellular communication network, such as by transmitting wireless signals to and/or receiving wireless signals from one or more wireless transmitters capable of transmitting and/or receiving wireless signals, such as a base station transceiver 108 over a wireless communication link 110, for example. Similarly, one or more client computing devices 102 may transmit wireless signals to and/or receive wireless signals from a local transceiver 112 over a wireless communication link 114, for example. Base station transceiver 108, local transceiver 112, etc. may be of the same or similar type, for example, and/or may represent different types of devices, such as access points, radio beacons, cellular base stations, femtocells, an access transceiver device, or the like, depending on an implementation. Similarly, local transceiver 112 may comprise, for example, a wireless transmitter and/or receiver capable of transmitting and/or receiving wireless signals. For example, at times, wireless transceiver 112 may be capable of transmitting and/or receiving wireless signals from one or more other terrestrial transmitters and/or receivers.

In a particular implementation, local transceiver 112 may, for example, be capable of communicating with one or more client computing devices 102 at a shorter range over wireless communication link 114 than at a range established via base station transceiver 108 over wireless communication link 110. For example, local transceiver 112 may be positioned in an indoor or like environment and/or may provide access to a wireless local area network (WLAN, e.g., IEEE Std. 802.11 network, etc.) and/or wireless personal area network (WPAN, e.g., Bluetooth® network, etc.). In another example implementation, local transceiver 112 may comprise a femtocell and/or picocell capable of facilitating communication via link 114 according to an applicable cellular or like wireless communication protocol. Again, it should be understood that these are merely examples of networks that may communicate with one or more client computing devices 102 over a wireless link, and claimed subject matter is not limited in this respect. For example, in some instances, operating environment 100 may include a larger number of base station transceivers 108, local transceivers 112, networks, terrestrial transmitters and/or receivers, etc.

In an implementation, one or more client computing devices 102, base station transceiver 108, local transceiver 112, etc. may, for example, communicate with one or more servers, referenced herein at 116, 118, and 120, over a network 122, such as via one or more communication links 124. Network 122 may comprise, for example, any combination of wired and/or wireless communication links. In a particular implementation, network 122 may comprise, for example, Internet Protocol (IP)-type infrastructure capable of facilitating or supporting communication between one or more client computing devices 102 and one or more servers 116, 118, 120, etc. via local transceiver 112, base station transceiver 108, directly, etc. In another implementation, network 122 may comprise, for example cellular communication network infrastructure, such as a base station controller and/or master switching center, to facilitate and/or support mobile cellular communication with one or more client computing devices 102. Servers 116, 118 and/or 120 may comprise any suitable servers or combination thereof capable of facilitating or supporting one or more operations, processes, techniques, approaches, etc. discussed herein. For example, servers 116, 118 and/or 120 may comprise one or more update servers, back-end servers, management servers, archive servers, location servers, positioning assistance servers, navigation servers, map servers, crowdsourcing servers, network-related servers, or the like.

Even though a certain number of computing platforms and/or devices are illustrated herein, any number of suitable computing platforms and/or devices may be implemented to facilitate and/or support one or more operations, processes, techniques, approaches, etc. associated with operating environment 100. For example, at times, network 122 may be coupled to one or more wired and/or wireless communication networks (e.g., WLAN, etc.) so as to enhance a coverage area for communications with one or more client computing devices 102, one or more base station transceivers 108, local transceiver 112, servers 116, 118, 120, or the like. In some instances, network 122 may facilitate and/or support femtocell-based operative regions of coverage, for example. Again, these are merely example implementations, and subject matter is not limited in this regard.

In this context, "IoT-type device" and/or the like refers to one or more electronic and/or computing devices capable of leveraging existing Internet or like infrastructure as part of the so-called "Internet of Things" or IoT, such as via a variety of applicable protocols, domains, applications, etc. As was indicated, the IoT is typically a system of interconnected and/or internet worked physical devices in which computing may be embedded into hardware so as to facilitate and/or support devices' ability to acquire, collect, and/or communicate content over one or more communications networks, for example, at times, without human participation and/or interaction. Client computing devices 102, which may, for example, include one or more IoT-type devices, may include a wide variety of stationary and/or mobile devices, such as, for example, automobile sensors, biochip transponders, heart monitoring implants, kitchen appliances, locks or like fastening devices, solar panel arrays, home gateways, smart gauges, smart telephones, cellular telephones, security cameras, wearable devices, thermostats, Global Positioning System (GPS) transceivers, personal digital assistants (PDAs), virtual assistants, laptop computers, notebook computers, personal entertainment systems, tablet devices, personal computers (PCs), personal audio and/or video devices, personal navigation devices, and/or the like, to name a few non-limiting examples. Typically, in this context, a "mobile device" and/or the like refers to an electronic and/or computing device that may from time to time have a position or location that changes. "Stationary device" and/or the like refers to a device that may have a position or location that generally does not change. In some instances, client computing devices 102, such as IoT-type devices, may be capable of being identified, such as uniquely, via an assigned Internet Protocol (IP) address, as one particular example, and/or having an ability to communicate, such as receive and/or transmit electronic content, for example, over one or more wired and/or wireless communications networks.

Figure 2:
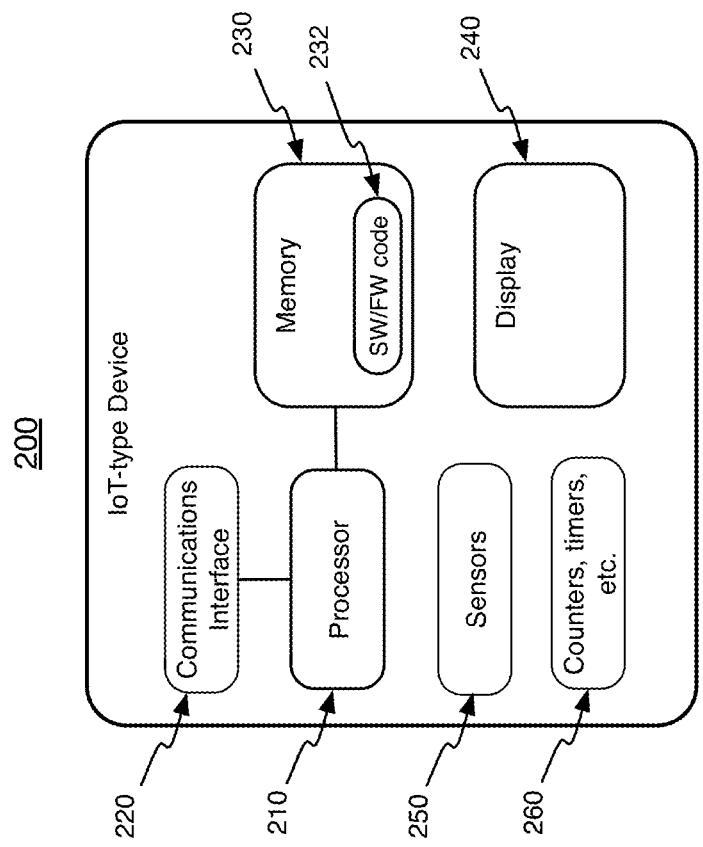
FIG. 2 is a schematic block diagram depicting an embodiment of an example client computing device, such as an Internet of Things (IoT) type device.

FIG. 2 is an illustration of an embodiment 200 of an example client computing device, such as an IoT-type device. Of course, subject matter is not limited in scope to the particular configurations and/or arrangements of components depicted and/or described for example devices mentioned herein. In an embodiment, a client computing device, such as IoT-type device 200, may comprise one or more processors, such as processor 210, and/or may comprise one or more communications interfaces, such as communications interface 220. In an embodiment, one or more communications interfaces, such as communications interface 220, may enable wireless communications between an electronic device, such as a client computing device, such as IoT-type device 200, and one or more other electronic devices (e.g., IoT-type device, server computing device, etc.). In an embodiment, wireless communications may occur substantially in accordance any of a wide range of communication protocols, such as those mentioned herein, for example.

In a particular implementation, a client computing device, such as IoT-type device 200, may include a memory, such as memory 230. In a particular implementation, memory 230 may comprise a non-volatile memory, for example. Further, in a particular implementation, a memory, such as memory 230, may have stored therein executable instructions, such as for one or more operating systems, communications protocols, and/or applications, for example. A memory, such as 230, may further store particular instructions, such as software and/or firmware code 232, that may be updated from time to time, for example. Further, in a particular implementation, a client computing device, such as IoT-type device 200, may comprise a display, such as display 240, and/or one or more sensors, such as one or more sensors 250. As utilized herein, "sensors" and/or the like refer to a device and/or component that may respond to physical stimulus, such as, for example, heat, light, sound pressure, magnetism, particular motions, etc., and/or that may generate one or more signals and/or states in response to physical stimulus. Example sensors may include, but are not limited to, one or more accelerometers, gyroscopes, thermometers, magnetometers, barometers, light sensors, proximity sensors, hear-rate monitors, perspiration sensors, hydration sensors, breath sensors, cameras, microphones, etc., and/or any combination thereof.

In particular implementations, a client computing device, such as IoT-type device 200, may include one or more timers and/or counters and/or like circuits, such as circuitry 260, for example. In an embodiment, one or more timers and/or counters and/or the like may track one or more aspects of device performance and/or operation. For example, timers, counters, and/or other like circuits may be utilized, at least in part, by a client computing device, such as IoT-type device 200, to determine measures of fitness, for example, and/or to otherwise generate feedback content related to checks and/or other tests, such as, but not limited to, composition checks, build checks, operation checks, etc., described more fully below.

Although FIG. 2 depicts a particular example implementation of a client computing device, such as IoT-type device 200, other embodiments and/or implementations may include other types, configurations, arrangements, etc. of electronic and/or computing devices. As mentioned, example types of devices may include, but are not limited to, automobile sensors, biochip transponders, heart monitoring implants, kitchen appliances, locks or like fastening devices, solar panel arrays, home gateways, smart gauges, smart telephones, cellular telephones, security cameras, wearable devices, thermostats, Global Positioning System (GPS) transceivers, personal digital assistants (PDAs), virtual assistants, laptop computers, notebook computers, personal entertainment systems, tablet devices, personal computers (PCs), personal audio and/or video devices, personal navigation devices, or any combination of the foregoing.

In an embodiment, a client computing device (e.g., via execution of an application), such as IoT-type device 200, may generate one or more queries, such as a query that may include a content request. A variety of query languages may exist to formulate queries for specific content being sought. Examples of query languages may include Structured Query Language (SQL), XML Path Language (XPATH), and/or GraphQL, but these are just illustrative examples. The term Structured Query Language, SQL, and/or similar terms are intended to refer to any version, now known and/or to be later developed of the Structured Query Language. Similarly, the term XML Path Language, XPATH, and/or similar terms are intended to refer to any version, now known and/or to be later developed, of the XML Path Language. Likewise, the term GraphQL, and/or similar terms are intended to refer to any version, now known and/or to be later developed, of the GraphQL query language. Furthermore, as used herein, the terms query, query request, queries and/or the like are intended to refer to one or more queries formulated in a particular query language, such as one of the foregoing languages, for example.

In embodiments, GraphQL may comprise a query language for an application programming interface (API) and/or a server-side runtime agent for executing queries using a type system and/or the like that may be defined for content to be sought. In particular implementations, GraphQL may not be tied to any specific database and/or storage engine and/or may instead be backed by existing code and/or content.

A GraphQL schema, for example, may comprise a specification of a set of content types and/or structures, levels of nesting, and/or fields, etc., for example, which may indicate content available, such as to be queried. Similarly, a GraphQL path may specify that for certain content fields a path may be followed and/or traversed to locate such content, such as in a repository. A GraphQL shape likewise may specify relationships within a GraphQL schema, such as for content types, etc., including interrelationships, nesting and/or other forms of association, for example.

As utilized herein, "graph" and/or the like represents a structure that may include points connected by edges, for example. Additionally, "data graph" and/or the like represents a model of content (e.g., data) available from a service structured as a graph. In an implementation, a graph may have the a number of properties. For example, in an implementation, a graph may comprise "points" and/or the like that may represent objects and/or properties. Points may optionally contain binary or textual data, for example. Graphs may also include "edges" and/or the like that may represent relationships between objects, for example. Also, in implementations, graphs may include queries that may terminate at certain points and/or that may change a graph in accordance with the following: a) queries may add or remove points; b) queries may add or remove edges connecting points; and/or c) queries may add, remove, or modify the data attached to points, for example. In implementations, one or more points may be tagged as roots for different categories of queries. For example, a read root may be provided such that queries that begin at a read root provide, but do not modify, graph content. In an implementation, a separate mutation root may be identified such that queries that begin at the mutation root may both modify and read graph data, for example.

As utilized herein, a "graph schema" and/or the like represents a description of an expected structure of a data graph. In an implementation, rather than enumerate points and edges (e.g., a representation that may be as large or even frequently much larger than content to be sought itself), a graph schema may provide a type system for the data graph with various example properties. For example, a graph schema may assign a "type" to points (e.g., every point in particular implementations) within a data graph. In implementations, a schema may specify constraints some point p may satisfy to be included within a type, including but not limited to: a) presence of one or more edges fulfilling arbitrary criteria beginning at p; and b) presence and/or shape of content contained by a point, for example. Further, for example, a graph schema may assign a "field" to edges (e.g., every edge in particular implementations) within a data graph. For example, fields may comprise a generalization over edges. In implementations, whereas an edge may describe a connection between specific objects in a data graph, fields may describe a connection between types. That is, fields may represent a class of relationship that may be represented between objects, for example. Also, in implementations, fields may be parameterized to represent a wider range of relationships. For example, a schema may define a User.friends(first: Int)→[User] field, which may connect a user to a list of their friends, limited in size to the specified number of friends. This example field may represent an unbounded number of edges, including "user A's first friend on the service", "user A's first two friends", "user A's first three friends", etc.

In implementations, a graph schema may define a "type graph" that may represent relationships between types. For example, within a type graph, points may comprise types and/or edges that may comprise "casts" representing relationships that types may have with each other. In a particular implementation, given two types A and B, the following relationships are possible: a) A may comprise a proper superset of B if all points within B also fall within A. In this case, B may have an unconditional edge to A and A may have a conditional edge to B; b) A may overlap with B if some but not all points within B are in A and some but not all points within A are in B. In this case, A and B may have conditional edges to each other; and/or c) A and B may be non-overlapping if there exist no points which are shared between them. In this case, no edges will exist between A and B. In implementations, there may exist a number of possible textual representations (e.g., encodings) of a graph schema, for example.

In implementations, a GraphQL service may be generated at least in part by defining types and/or fields on those types and/or providing functions for fields on individual types. For example, a GraphQL service that may indicate an identity of a logged-in user is (e.g., "me") as well as that logged-in user's name might look like the following:

```
type Query {
    me: User
}
type User {
    id: ID
    name: String
}
```

Functions for each field on each type may appear as follows, for example:

```
function Query_me(request) {
    return request.auth.user;
}
function User_name(user) {
    return user.getName( );
}
```

In implementations, once running (e.g., at a URL on a web service) a GraphQL may receive GraphQL queries to validate and/or execute. A service may first check a query to ensure it refers to the types and/or fields defined and then may run the specified functions to produce a result. For example, a query:

```
{
    me {
        name
    }
}
``` may generate the following JSON result, for example:

```
{
    "me": {
        "name": "Luke Skywalker"
    }
}
```

In implementations, an example GraphQL query language may relate at least in part to selecting fields on objects.

```
{
    hero {
        name
        appearsIn
    }
}
{
    "data": {
        "hero": {
            "name": "R2-D2",
            "appearsIn": [
                "NEWHOPE",
                "EMPIRE",
                "JEDI"
            ]
        }
    }
}
```

For the example query shown above, processing may begin with a special "root" object. Subsequently, the "hero" field may be selected, for example. For the object returned by "hero," the "name" and "appearsIn" fields may be selected, for example.

Because a shape of a GraphQL query may closely match a result, one may predict what a query may return without knowing much about the server, for example. However, it may be advantageous and/or beneficial to have a more exact description of the content (e.g., data) one may ask for—what fields can one select? What kinds of objects might the fields return? What fields are available on those sub-objects? In implementations, a schema, such as a GraphQL schema, may help provide the aforementioned advantages and/or benefits, as explained more fully below.

In implementations, a schema, such as a GraphQL schema, may define a set of types which may describe (e.g., may completely describe in particular implementations) a set of possible content one may access on a particular service. In an implementation, responsive at least in part to receiving one or more queries, the one or more queries may be validated and/or executed against the particular schema, for example.

In implementations, GraphQL services may be written in any language. Because one may not rely on a specific programming language syntax, like JavaScript, to discuss GraphQL schemas, an example GraphQL schema language, similar in at least some respects to a GraphQL query language, may be utilized herein for various examples to allow language-agnostic discussion of schemas, such as GraphQL schemas. Although example embodiments and/or implementations may be described herein, at least in part, in connection with GraphQL, subject matter is not limited in scope in this respect. That is, GraphQL is utilized herein as a non-limiting example.

In implementations, basic components of a GraphQL schema may comprise object types, which may represent a kind of object that may be fetched from a service, and what fields the object types may have. In an example GraphQL schema language, an example object type may be represented as follows:

```
type Character {
    name: String!
    appearsIn: [Episode!]!
}
```

For the example above, "Character" may comprise a GraphQL Object Type, meaning its a type with some fields. Many, or most, of the types in a schema may comprise object types, for example. Also, for example, "name" and "appearsIn" may comprise fields on the Character type. For example, name and appearsIn may comprise fields that may appear in a part of a GraphQL query that operates on the Character type. "String," for example, may comprise one of the built-in scalar types. Scalar types may resolve to a single scalar object and may not have sub-selections in a query, for example. Further, "String!" may specify that a field is non-nullable, meaning that the GraphQL service may always provide a value when this field is queried. In the example type language, non-nullable fields may be represented as those with an exclamation mark. Additionally, [Episode!]! may represents an array of Episode objects. Because it may also be non-nullable, one may expect an array (e.g., with zero or more items) in response to the appearsIn field being queried. Also, because Episode! may also be non-nullable, one may expect individual items of the array to be Episode objects, for example.

The above discussion may provide some understanding of what an example GraphQL object type may look like and/or may also provide some understanding of how to read some basics of an example GraphQL-type language. In implementations, an organization may advantageously expose a single graph that may provide a unified interface for querying various combinations of content sources. However, it may be challenging to represent an enterprise-scale graph with a single, monolithic GraphQL service, for example.

To address this challenge, at least in part, a federated approach may be utilized to divide a graph implementation across multiple back-end services. An example architecture utilizing a federated approach may include, for example, a collection of subgraphs (e.g., usually represented by different back-end services) that may individually define particular GraphQL schema and/or a gateway that may utilize a supergraph schema (e.g., composed from subgraph schemas) to execute queries across multiple subgraphs.

Figure 3:
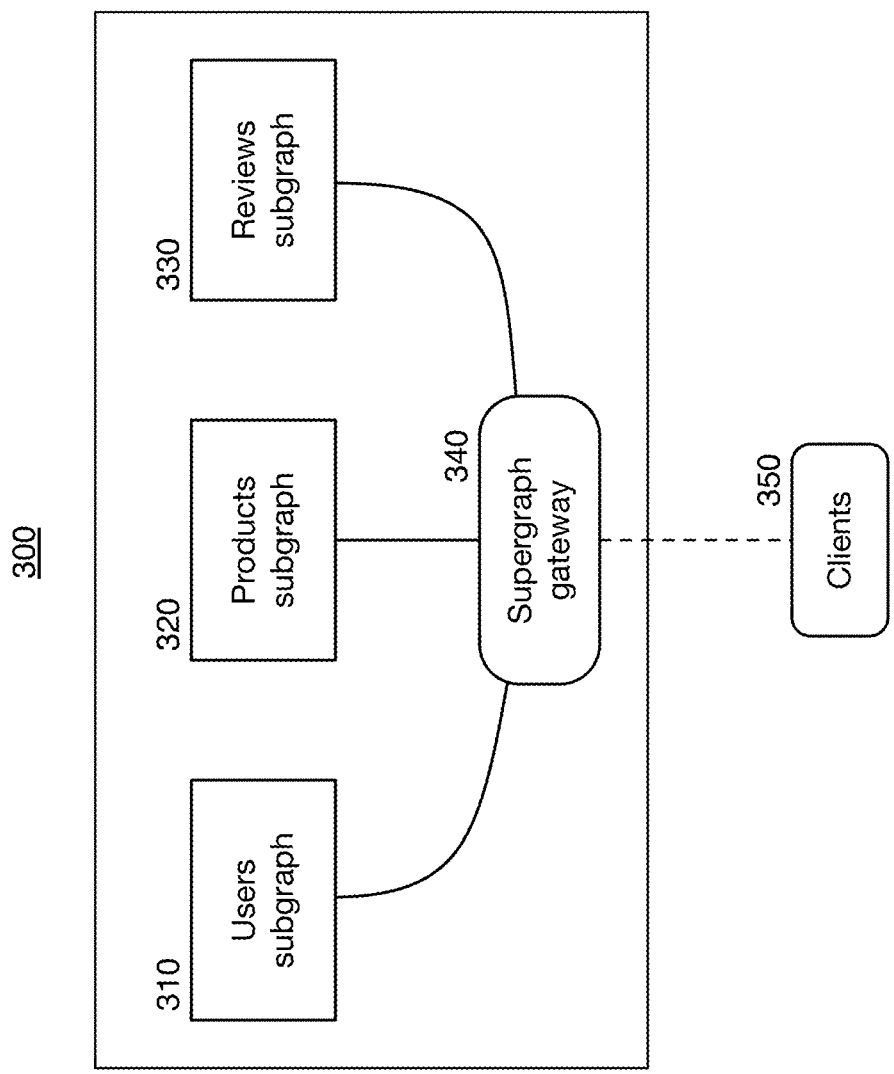
FIG. 3 depicts an example graph implemented across multiple back-end services, in accordance with an embodiment.

For example, as depicted in FIG. 3, a graph (e.g., supergraph), such as supergraph 300, may be implemented across multiple back-end services including, for example, a first subgraph, such as "Users" subgraph 310, a second subgraph, such as "Products" subgraph 320, and/or a third subgraph, such as "Reviews" subgraph 330. Subgraphs 310, 320 and/or 330, for example, may be composed into supergraph 300. By querying supergraph 300, one or more client computing devices or clients 350 may query any or all of subgraphs 310, 320 and/or 330 at the same time, for example. In an implementation, a gateway, such as supergraph gateway 340, may serve as an access point for a supergraph, such as supergraph 300. In an implementation, a gateway, such as supergraph gateway 340, may receive incoming GraphQL operations (e.g., queries) and/or may intelligently distribute the incoming GraphQL operations across subgraphs, such as subgraphs 310, 320 and/or 330. From the perspective of clients 350, querying subgraphs via supergraph gateway 340 may look the same as querying any other GraphQL server (e.g., no special configuration may be needed), for example.

Unlike other distributed GraphQL architectures such as, for example, schema stitching, a federated approach may utilize a declarative programming model that may enable individual subgraphs to implement a specified part of a composed supergraph for which the individual subgraphs may be responsible. A federated approach may also enable one to add, remove, and/or refactor subgraphs without incurring downtime for production graphs, for example.

In implementations, libraries may be provided to allow a server to act as a subgraph and/or as a gateway, for example. Such components may be implemented in any language and/or framework.

In an implementation, a federated approach may be adopted incrementally. For example, for implementations using a monolithic GraphQL server, functionality may be converted to a federated approach one service at a time. Further, for example, for implementations using other architectures (e.g., schema stitching), support for a federated approach may be added to existing services one at a time. In such cases, clients may continue to work and/or may have no way to distinguish between different graph implementations. Thus, a federated approach may be adopted and/or implemented without adverse implications to clients, for example.

In implementations, a federated approach may encourage a design principle that may be referred to as "separation of concerns." Such a principle may enable different teams within an enterprise to work on different products and/or features within a single graph without interfering with each other.

When considering how to split a single GraphQL schema across multiple subgraphs, it may seem straightforward to divide schemas up by type. For example, a "users" subgraph may define a User type, a "products" subgraph may define a Product type, and so on:

```
Users subgraph:
type User {
    id: ID!
    name: String
    reviews: [Review]
    purchases: [Product]
}
Products subgraph:
type Product {
    id: ID!
    name : String
    price: String
    reviews: [Review]
}
Reviews subgraph:
type Review {
    id: ID!
    body: String
    author: User
    product: Product
}
```

Although this separation may appear relatively straightforward, it may pose issues. For example, a particular feature and/or concern may sometimes span multiple types. Consider, for example, the User.purchases field of the User type in the above schema. Even though this field is a member of the User type, a list of Products should probably be populated by the Products subgraph rather than the Users subgraph. In implementations, by defining the User.purchases field in the Products subgraph instead, the subgraph that defines the field may also be the subgraph that specifies how to populate the field. In some circumstances, the Users subgraph might not even have access to the back-end content store that contains product content, for example. Also, by defining the User.purchases field in the Products subgraph, for example, the team that manages product content may contain product-related logic in a single subgraph for which they may be responsible.

The following example schema uses a federated approach to divide the same set of types and fields across the same three subgraphs (note: some federation-specific syntax is omitted here for clarity and/or ease of explanation):

```
Users subgraph
type User {
    id: ID!
    name: String
}
Products subgraph
type Product {
    id: ID!
    name : String
    price: String
}
type User {
    id: ID!
    purchases: [Product]
}
Reviews subgraph
type Review {
    id: ID!
    body: String
    author: User
    product: Product
}
type User {
    id: ID!
    reviews: [Review]
}
type Product {
    id: ID!
    reviews: [Review]
}
```

The difference is that now, individual subgraphs may define (e.g., may at least mostly define) types and/or fields that they are capable of, and/or may be responsible for, populating from their respective back-end content stores, for example. The result may be the best of both worlds: an implementation that keeps code for a given feature in a single subgraph and separated from unrelated concerns and a product-centric schema with rich types that may reflect the way an application developer may want to consume the graph, for example.

Figure 4:
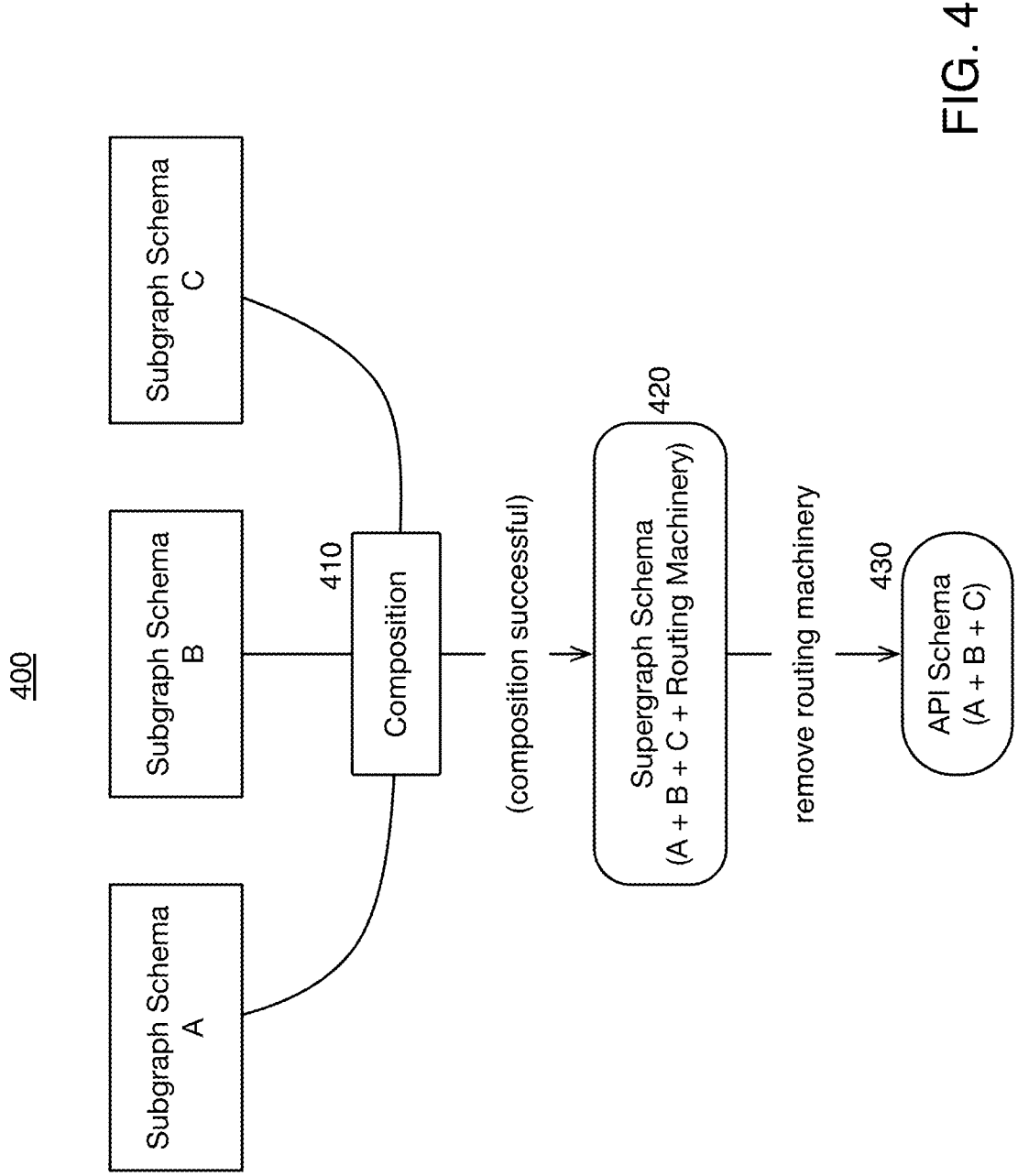
FIG. 4 is an illustration depicting an example federated graph, in accordance with an embodiment.

FIG. 4 is an illustration depicting an example federated graph 400. In implementations, a federated graph, such as graph 400, may utilize multiple types of GraphQL schemas. For example, subgraphs schemas, such as subgraph schemas A, B, and/or C, may individually comprise distinct schemas that may indicate which types and/or fields that a composed supergraph may be responsible for resolving. A supergraph schema, such as supergraph schema 420, may comprise the result of performing composition, such as composition operation 410, on a collection of subgraph schemas, such as subgraph schemas A, B, and/or C. A supergraph schema may combine all of the types and/or fields from subgraph schemas plus some federation-specific directives that may instruct a gateway as to which subgraphs may be responsible for resolving particular fields, in implementations.

Additionally, an API schema, such as API schema 430, may resemble a supergraph schema, such as supergraph schema 420, in some respects, but it may omit types, fields, and/or directives that may be considered "machinery" and may not be part of an enterprise's public API. This may include federation-specific directives, for example. An API schema may expose a gateway to a GraphQL API's consumers who may not need to know any internal implementation details about a particular graph, for example.

Consider an example. Below, schemas may be defined for three subgraphs in a basic example e-commerce application. Individual subgraphs may be implemented as a separate GraphQL API, for example:

```
Users subgraph
    type Query {
        me: User
    }
    type User @key(fields: "id") {
        id: ID!
        username: String! @shareable
    }
    # (Subgraph schemas include
    # this to opt in to
    # Federation 2 features.)
    extend schema
        @link(url: "https://specs.apollo.dev/federation/v2.0",
            import: ["@key", "@shareable"])
Products Subgraph
    type Query {
        topProducts(first: int = 5): [Product]
    }
    type Product @key(fields: "upc") {
        upc: String!
        name: String!
        price: Int
    }
    extend schema
        @link(url: "https://specs.apollo.dev/federation/v2.0",
            import: ["@key", "@shareable"])
Reviews subgraph
    type Review {
        body: String
        author: User @provides(fields: "username")
        product: Product
    }
    type User @key(fields: "id") {
        id: ID!
        username: String! @external
        reviews: [Review]
    }
    type Product @key(fields: "upc") {
        upc: String!
        reviews: [Review]
    }
    # (This subgraph uses additional
    # federated directives)
    extend schema
        @link(url: "https://specs.apollo.dev/federation/v2.0"
            import: ["@key", "@shareable", "@provides", "@external"])
```

As the above example schemas show, multiple subgraphs may contribute unique fields to a single type. For example, the Products subgraph and the Reviews subgraph both contribute fields to the Product type.

In implementations, a supergraph schema, such as supergraph schema 420, may comprise the output of schema composition, such as schema composition operation 410 depicted in FIG. 4. In implementations, a supergraph schema may provide a gateway, such as gateway 340, with the name and endpoint URL for the individual subgraphs. A supergraph may include types and/or fields (e.g., all, most, etc. of the types and/or fields) defined by the subgraphs, for example. Also, in an implementation, a supergraph may tell the gateway which of the subgraphs can resolve which GraphQL fields, for example. The supergraph schema example provided below represents an example result of a composition operation performed utilizing the example subgraph schemas provided above.

```
schema
    @link(url: "https://specs.apollo.dev/link/v1.0")
    @link(url: "https://specs.apollo.dev/join/v0.2", for: EXECUTION)
{
    query: Query
}
directive @join_field(graph: join_Graph!, requires: join_FieldSet, provides:
join_FieldSet, type:
        String, external: Boolean, override: String, usedOverridden: Boolean) repeatable on
            FIELD_DEFINITION | INPUT_FIELD_DEFINITION
directive @join_graph(name: String!, url: String)) on ENUM_VALUE
directive @join_implements(graph: join Graph!, interface: String!) repeatable on
OBJECT |
        INTERFACE
directive @join_type(graph: join_Graph!, key: join_FieldSet, extension: Boolean! = false,
        resolvable: Boolean! = true) repeatable on OBJECT | INTERFACE | UNION | ENUM
|
        INPUT_OBJECT | SCALAR
directive @link(url: String, as: String, for: link_Purpose, import: [link_Import]) repeatable
on
        SCHEMA
scalar join_FieldSet
enum join_Graph {
    PRODUCTS @join_graph(name: "products", url: "http://localhost:4003/graphql")
    REVIEWS @join_graph(name: "reviews", url: "http://localhost:4002/graphql")
    USERS @join_graph(name: "users", url: "http://localhost:4001/graphql")
}
scalar link_Import
enum link_Purpose {
    """
    'SECURITY' features provide metadata necessary to securely resolve fields.
    """
    SECURITY
    """
    'EXECUTION' features provide metadata necessary for operation execution.
    """
    EXECUTION
}
type Product
    @join_type(graph: PRODUCTS, key: "upc")
    @join_type(graph: REVIEWS, key: "upc")
{
    upc: String!
    name: String! @join_field(graph: PRODUCTS)
    price: Int @join_field(graph: PRODUCTS)
    reviews: [Review] @join_field(graph: REVIEWS)
}
type Query
    @join_type(graph: PRODUCTS)
    @join_type(graph: REVIEWS)
    @join_type(graph: USERS)
{
    topProducts(first: Int = 5): [Product] @join_field(graph: PRODUCTS)
    me: User @join_field(graph: USERS)
}
type Review
    @join_type(graph: REVIEWS)
{
    body: String
    author: User @join_field(graph: REVIEWS, provides: "username")
    product: Product
}
type User
    @join_type(graph: REVIEWS, key: "id")
    @join_type(graph: USERS, key: "id")
{
    id: ID!
    username: String! @join field(graph: REVIEWS, external: true) @join_field(graph:
USERS)
    reviews: [Review] @join_field(graph: REVIEWS)
}
```

In implementations, a gateway, such as gateway 340, may utilize a supergraph schema, such as supergraph schema 420, to generate a GraphQL API schema, such as API schema 430. An API schema, such as the example API schema provided below, may represent the combination of the various subgraph schemas:

```
type Product {
  name: String!
  price: Int
  reviews: [Review]
  upc: String!
}
type Query {
  me: User
  topProducts(first: Int = 5): [Product]
}
type Review {
  author: User
  body: String
  product: Product
}
type User {
  id: ID!
  reviews: [Review]
  username: String!
}
```

As explained, an enterprise may have one unified graph (e.g., supergraph) as opposed to multiple graphs created by different teams, for example. By having a unified graph, the value of GraphQL may be enhanced. For example, more content and/or services may be accessed from a single query. That is, for example, a unified graph may provide for a single source of truth for a number (e.g., all, most, etc.) services and/or may provide faster apps, quicker delivery, reduced maintenance overhead, etc. Also, for example, code, queries, skills and/or experience may be more portable across teams. A unified graph may also yield a central catalog of available content to which graph users may look, for example. Further, implementation costs may be reduced due at least in part to at least a good deal of graph implementation work not being duplicated across teams. Additionally, for example, central management of a graph may be unified across control policies. "Unified graph" and/or the like in this context refers to a graph composed from one or more graphs, such as subgraphs. "Supergraph" and/or the like refers to an example unified graph composed from one or more subgraphs. "Unified graph" and/or the like and "supergraph" and/or the like may be utilized herein interchangeably.

In implementations, although there may only be a single graph, implementation of that graph may be federated across multiple teams within an enterprise. For example, monolithic architectures may be difficult to scale without specialized infrastructure, and graphs may be no exception. Instead of implementing an organization's entire graph layer in a single codebase, for example, responsibility for defining and/or implementing a graph may be divided across multiple teams. In implementations, individual teams may be responsible for maintaining the portion of a schema that exposes their content and/or services while having the flexibility to develop independently and/or operate on their own release cycle. This may maintain advantages of a single, unified view of a graph while decoupling development efforts across an entity, for example.

Regardless of the many advantages of unified (e.g., supergraph) schemas, unified graphs may also pose challenges. For example, unified graphs may pose a challenge with respect to supporting different experiences and/or levels of access for different entities and/or types of users such as customers, employees, suppliers, and/or partners, for example, and/or with respect to providing partners and/or public API users with a schema geared towards their particular integration and/or app development needs, for example. Also, unified graphs may pose challenges with respect to providing client-specific backend-for-frontend (BFF) and/or experience-driven schemas alongside a canonical domain-driven schema, for example. Unified graphs may also pose challenges with respect to restricting access to experimental and/or non-stable parts of a schema while still allowing access for testing and/or early adopters, for example. Generally, such challenges may be summarized as a question of how to serve multiple different audiences with a single unified graph.

Such challenges and/or the like may be addressed, at least in part, via example embodiments described herein wherein unified graphs, such as supergraphs, may be tailored for different audiences. For example, just as a federated approach described above may provide modularity on the backend, example embodiments, such as described below, may provide modularity for the frontend. For example, embodiments may provide for subset representations of a unified graph, wherein the representations may comprise filtered subsets of the unified graph.

Figure 5:
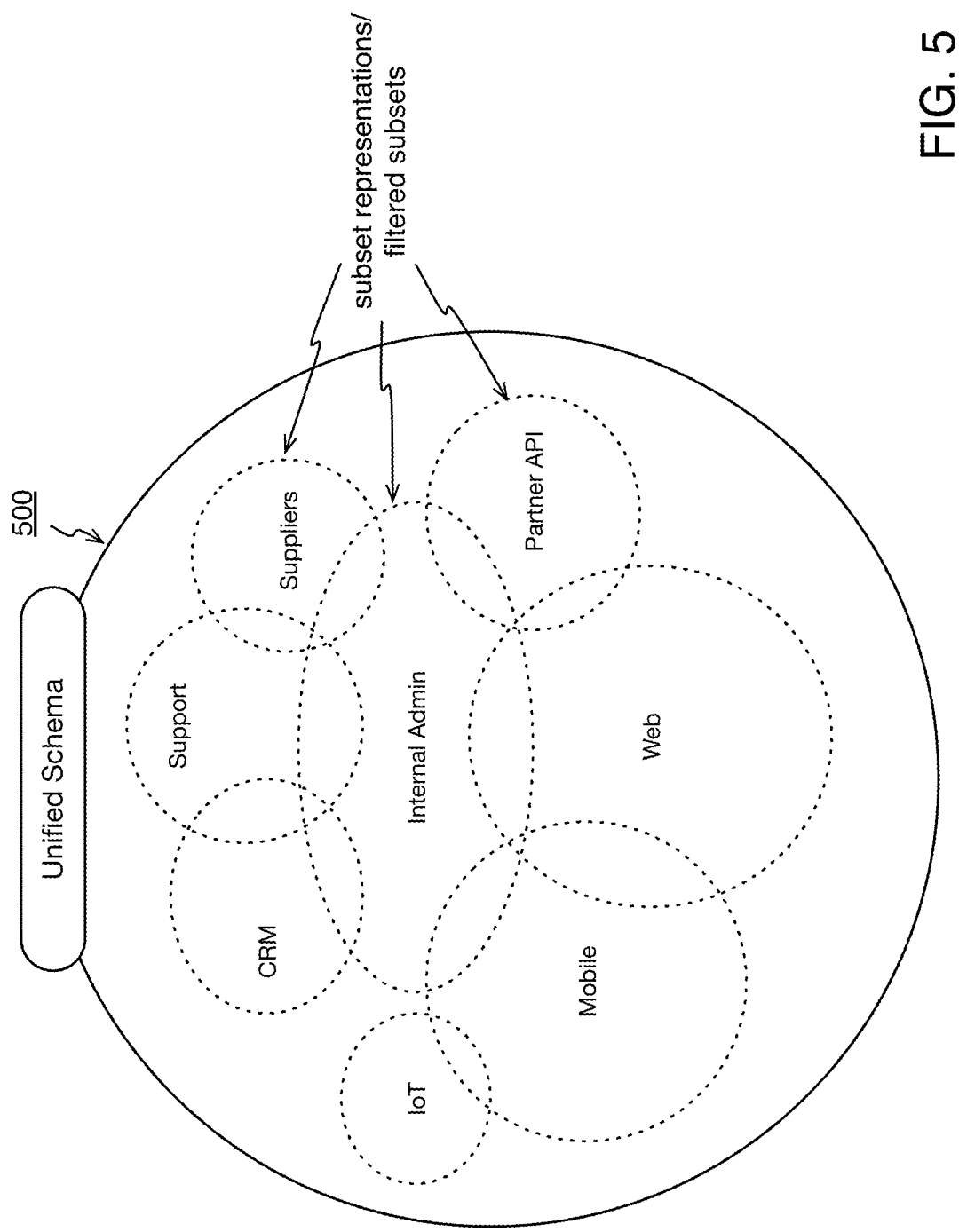
FIG. 5 is an illustration depicting an example unified graph schema and a plurality of subset representations thereof, in accordance with an embodiment.

FIG. 5 is an illustration depicting a unified graph schema (e.g., supergraph schema) 500 and a plurality of subset representations thereof. As depicted, a number of entities and/or systems across an enterprise, including, for example, partners of the enterprise, may have access to various respective representations of unified schema 500. In implementations, particular subset representations of a unified graph may be tailored to align with the needs, wants and/or specifications of a particular developer audience (e.g., to streamline the graph experience) rather than providing access to the entire graph to every internal and/or external developer, for example. In implementations, subset representations of a supergraph, for example, may allow for separate subsets of the supergraph for partner developers, specific client applications, public APIs, experimental features, etc., without losing advantages of unified graphs (e.g., supergraphs).

"Subset representation" and/or the like in this context refers to a subset of a unified graph specified by one or more particular parameters of the graph. As explained more fully below, subset representations may be generated at least in part by applying filters to unified graphs. As also explained more fully below, access may be provided to unified graphs based at least in part on the applied filters, in implementations.

Figure 6:
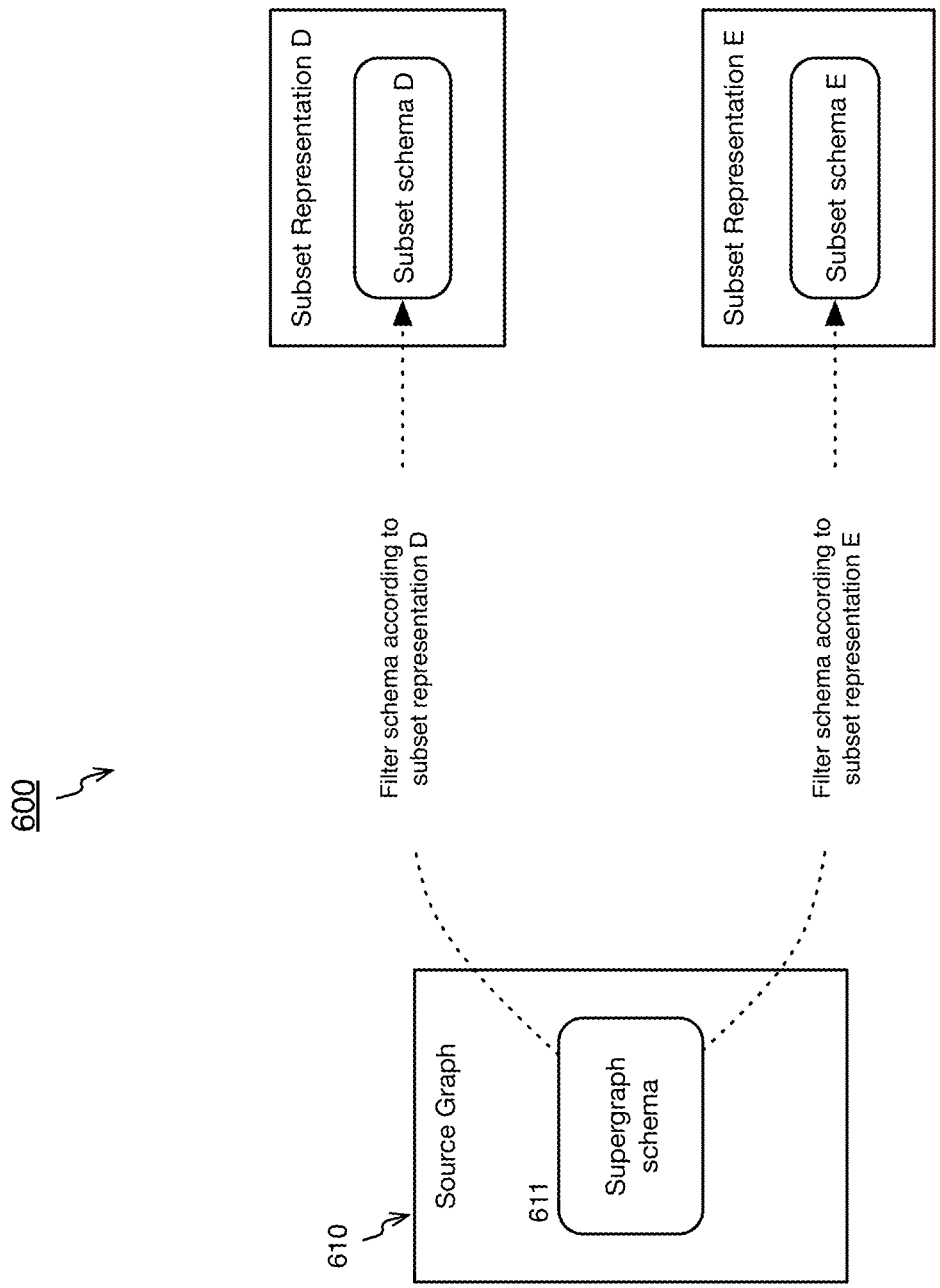
FIG. 6 depicts an illustration of an example approach for generating subset representations of a source graph, in accordance with an embodiment.

FIG. 6 depicts an illustration of an approach 600 for generating subset representations of a source graph 610. As mentioned, subset representations of a particular source graph, such as source graph 610 (e.g., supergraph), may enable delivery of different subsets of the source graph to different consumers. Individual subset representations may filter particular portions of a source graph's schema, such as supergraph schema 611, into different subsets. For example, as depicted in FIG. 6, supergraph schema 611 may be filtered in a particular manner to generate a subset representation "D." Supergraph schema 611 may further be filtered to generate another subset representation "E," for example.

In implementations, subset representations of a graph may be realized by way of a relatively simple, but potentially powerful, directive that may be applied to various schema elements including, but not limited to, fields, interfaces, objects, types, and/or unions, for example. In implementations, filter rules may be created that may include or exclude particular tags. For example, anything not included in a specified subset representation may be removed from client-facing schema but may still be included in the internal supergraph schema to be utilized for federation, routing, and so forth.

In implementations, schema element definitions, for example, may be filtered from a source graph schema based, at least in part, on a "@tag" directive that may be added to the source graph schema. Consider an example source graph schema, provided below:

```
type Product {
    id: ID!
    name: String!
    codename: String! @tag(name: "internal")
}
```

For the current example, the @tag "internal" may signify that any schema elements marked with the @tag directive "internal" may be treated in some way in generating a particular subset representation of the source graph. For example, the @tag "internal" may indicate to exclude particular schema elements from a subset representation of the source graph. Other tags, for example, may indicate to include particular schema elements, as explained more fully below. For the particular example source graph schema provided above, the field "codename" is marked with the @tag directive "internal." A resulting subset representation, excluding all schema elements marked "internal," for example, is provided below:

```
type Product {
    id: ID!
    name: String!
    # codename field is filtered out
}
```

It may be noted that that the "codename" field has been filtered out in the subset representation due at least in part to the @tag "internal." Of course, "@tag" is merely an example of a directive that may be utilized to signify elements to be filtered from a unified graph, and subject matter is not limited in scope in this respect.

Figure 7:
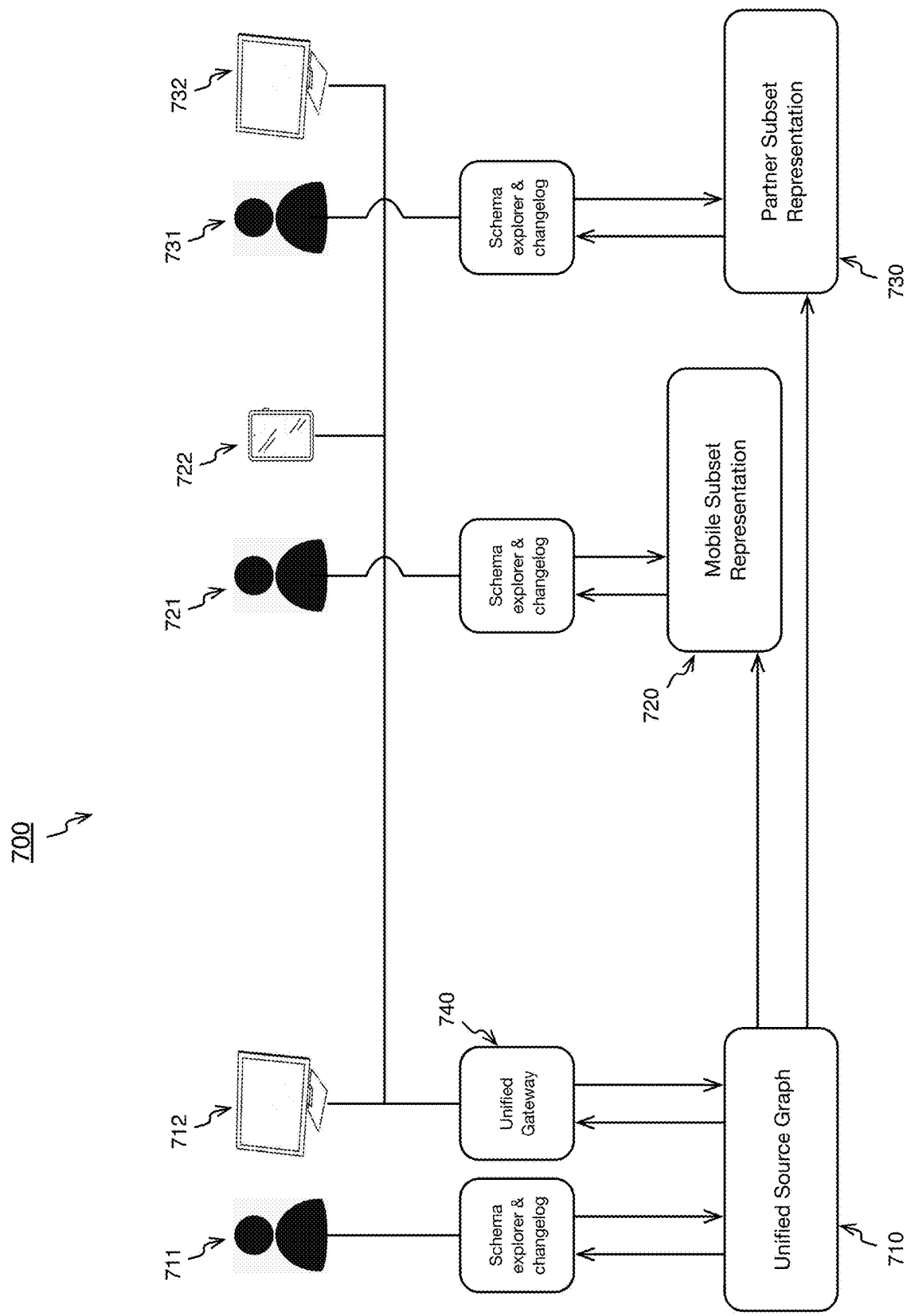
FIG. 7 depicts an illustration of documentation-type subset representations of a unified source graph, in accordance with an embodiment.

As explained below, implementations may utilize subset representations of graph schema as documentation and/or as a running endpoint. For example, FIG. 7 depicts an illustration 700 of a documentation-type subset representation of a unified source graph, such as unified source graph 710. In an implementation, one may utilize subset representations (e.g., filtered subsets) of a graph schema merely for documentation if one merely wishes to streamline the graph experience for developers by showing the developers only appropriate fields from the graph. For example, a subset representation may be created that only includes portions of a graph that are relevant to mobile developers and that removes portions that may only be useful to other developers, such as developers for web or IoT applications, for example. However, for documentation-type subset representations, queries may be run against an entire unified source graph, for example.

In implementations, different developers, for example, may have access to tailored graph schema via a schema explorer tool (e.g., software application) and/or via a changelog that may be scoped to relevant subsets of a source graph. For example, as depicted in FIG. 7, a first audience, such as developers 711, may have access (e.g., via a schema explorer tool) to unified source graph 710, for example. Also, for example, a first set of devices 712 may access (e.g., query) unified source graph 710 via a unified gateway, such as unified gateway 740.

Additionally, for example, a first subset representation, such as mobile subset representation 720, may comprise a particular documentation-type subset representation of source graph 710 tailored to a particular audience, such as mobile developers 721. In an implementation, mobile developers 721 may have visibility only with respect to mobile subset representation 720. However, due at least in part to mobile subset representation 720 comprising a documentation-type subset representation, mobile devices 722 may run queries against the entire unified source graph 710 (e.g., by way of unified gateway 740), in an implementation.

Similarly, partner subset representation 730 may also comprise a documentation-type subset representation tailored to a particular audience, such as partner developers 731. However, although partner developers 731 may have visibility only into partner subset representation 730, partner devices 732 may run queries against the entire unified source graph 710 via unified gateway 740, in an implementation.

Figure 8:
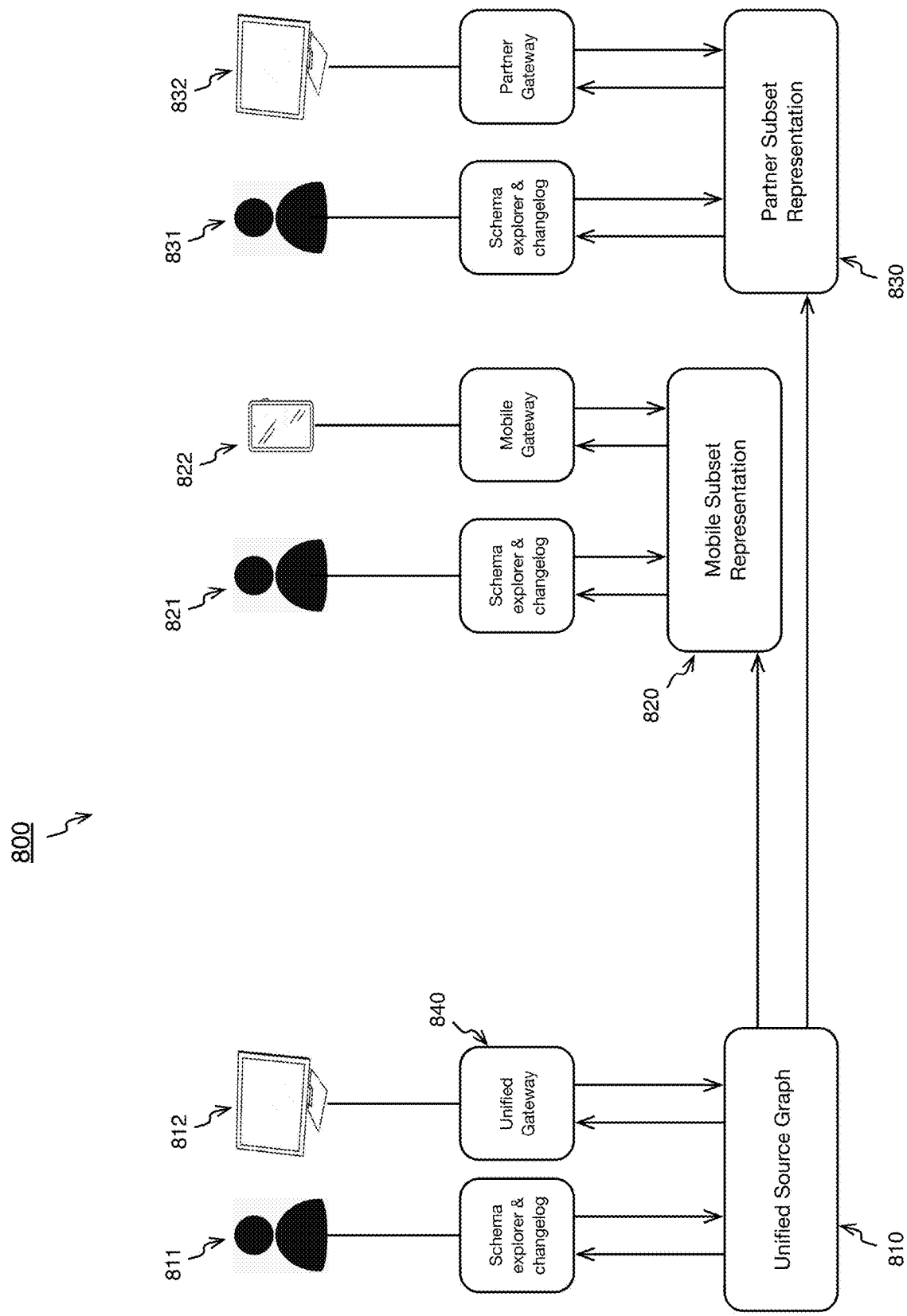
FIG. 8 depicts an illustration of deployed-type subset representations of a unified source graph, in accordance with an embodiment.

FIG. 8 depicts an illustration 800 of deployed-type subset representations of a unified source graph, such as unified source graph 810, for example. In implementations, deployed-type subset representations may be utilized for circumstances in which it may be advantageous and/or desirable to restrict not only what appears in the documentation, but also what can actually be queried by a particular audience. To accomplish this, dedicated gateways and/or routers may run the various subset representations as separate endpoints. For example, developers accessing a deployed subset representation endpoint may only be able to query parts of the graph that are included in the particular subset representation and/or may encounter an error if the developers try to query fields that are not included in the particular subset representation. In implementations, deployed-type subset representations may be advantageously utilized for building endpoints for external partners and/or for public-facing APIs, for example. Of course, subject matter is not limited in scope in these respects.

Referring again to the particular example depicted in FIG. 8, a first audience 811 may access the entirety of unified source graph 810 via a schema explorer-type application and/or via a changelog, for example. A first set of devices 812 may query the entirety of unified source graph 810 via a unified gateway 840, in an implementation.

Similar in at least some respects to the example discussed above in connection with FIG. 7, a second audience, such as mobile developers 821, for example, may only have visibility into a particular subset representation (e.g., mobile subset representation 820) of the source graph. Additionally, in contrast with the documentation-type example of FIG. 7, mobile devices 822 may only run queries against mobile subset representation 820 via a particular gateway (e.g., "mobile" gateway) and may not have access to the entire unified source graph 810. That is, for example, mobile subset representation 820 may run as an endpoint for mobile device 822, in an implementation. Also, for example, partner developers 831 may have visibility into partner subset representation 830 and/or partner devices 832 may query partner subset representation 830 via a dedicated gateway (e.g., "partner" gateway).

Figure 9:
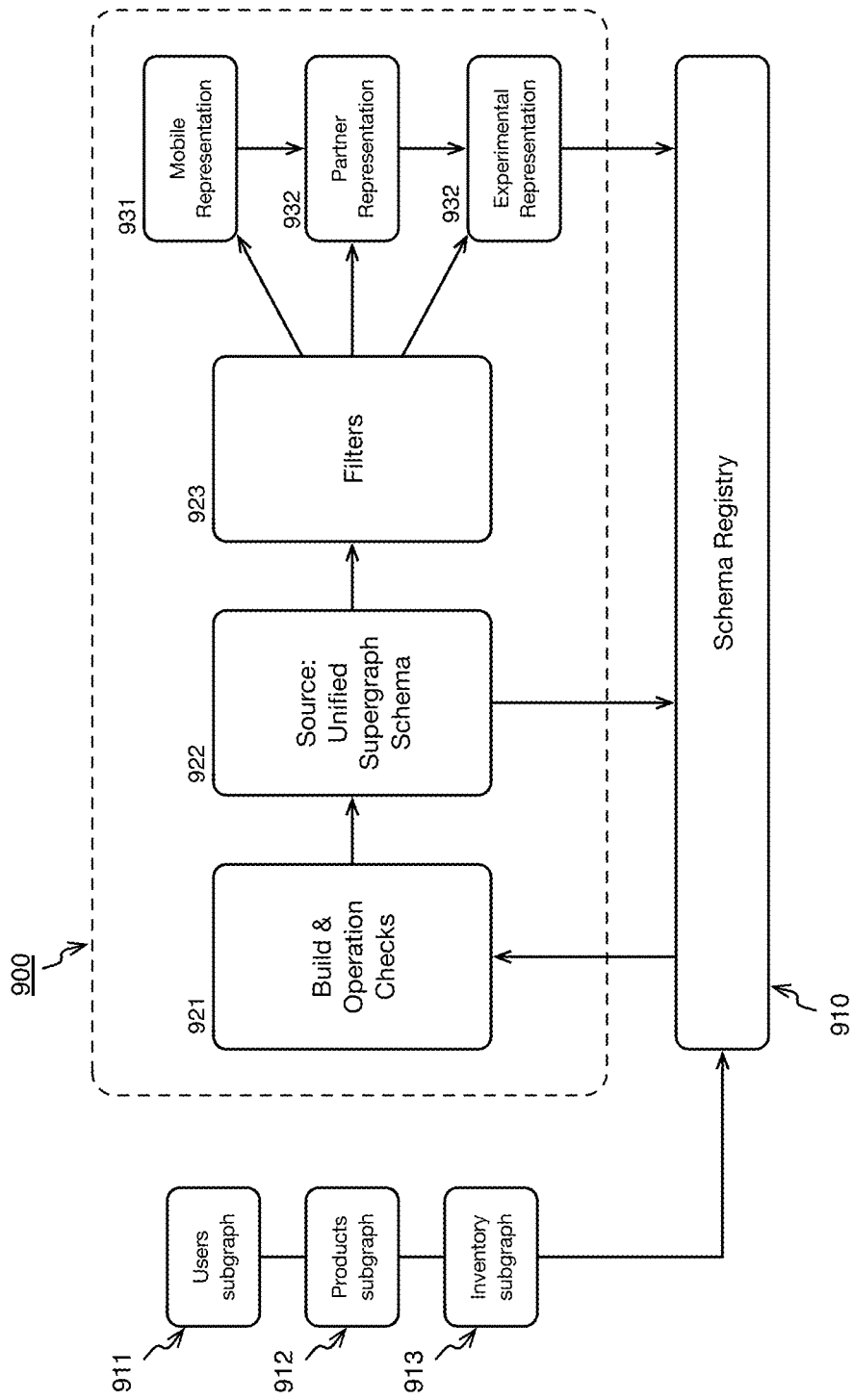
FIG. 9 depicts a schematic block diagram illustrating an example system for generating subset representations of a source supergraph, in accordance with an embodiment.

FIG. 9 depicts a schematic block diagram illustrating an embodiment 900 of a system for generating subset representations of a source supergraph. Embodiments may include all of the operations, processes, techniques, approaches, etc. described, fewer than the operations, processes, techniques, approaches, etc. described, and/or more than the operations, processes, techniques, approaches, etc. described for example system 900. Likewise, it should be noted that content acquired or produced, such as, for example, input signals, output signals, operations, results, etc. associated with the example provided may be represented via one or more analog and/or digital signals and/or signal packets. It should also be appreciated that even though one or more operations, processes, techniques, approaches, etc. are illustrated or described concurrently or with respect to a certain sequence, other sequences or concurrent operations processes, techniques, approaches, etc. may be employed. Further, it should be noted that operations, processes, techniques, approaches, etc. may be implemented, performed, etc. by any combination of hardware, firmware and/or software. In addition, although the description below references particular aspects and/or features illustrated in certain other FIGURES, one or more operations, processes, techniques, approaches, etc. may be performed with other aspects and/or features.

Generally, for example, backend-for-frontend (BFF) implementations and/or other customized APIs for different audiences may be advantageously utilized in providing streamlined developer experiences. However, such approaches may also result in additional overhead with respect to maintenance. In implementations, a particular advantage of the example subset representation approaches discussed herein may be that subset representations may automatically remain up-to-date with very little or no additional manual work when combined with the federated approaches discussed herein.

For example, with a federated approach, independent backend service teams, such as a Users team, a Products team and/or an Inventor team, for example, may publish subgraph schema updates. For example, referring to example system 900, the Users team, the Products team and/or the Inventor team may update their respective subgraphs (e.g., Users subgraph 911, Products subgraph 912 and/or Inventor subgraph 913, respectively) and/or may store the updated subgraphs in a schema repository 910, in an implementation. Schema repository 910 may be contained in one or more memories of a computing device, such as IoT device 200 and/or computing device 1404 of FIG. 14, for example. In an implementation, the various backend service teams, including, for example, the Users team, the Products team and/or the Inventor team, may update their respective subgraph schemas to include tags that may be utilized to specify particular subset representations.

As indicated at block 921, build and/or operation checks may be performed on the updated subgraphs, for example. In an implementation, such checks may determine whether the subgraphs are composable into a supergraph and/or whether any particular operations performed by client computing devices in accessing a previous version of a supergraph, or a subset representation thereof, may be broken as a result of the updates to the various subgraphs, for example. Of course, these are merely examples of checks that may be performed and subject matter is not limited in scope in these respects.

In an implementation, subgraph schemas, such as Users subgraph 911, Products subgraph 912 and/or Inventor subgraph 913, may be composed together into a supergraph schema which may subsequently be utilized to power a gateway and/or router, as indicated at block 922. In an implementation, a composed supergraph may be stored in schema repository 910, for example.

Additionally, in implementations, based at least in part on included tags and/or other specified directives, filters may be run on the unified supergraph schema to derive (e.g., automatically derive) the various filtered subsets (e.g., subset representations). For example, as indicated at block 923, one or more filters may be applied to the generated supergraph to yield one or more subset representations. In an implementation, one or more @tag directives, for example, may indicate to system 900 to include or exclude (e.g., depending on particular specified parameters and/or directives) specified schema elements from the supergraph in generating mobile subset representation 931, partner subset representation 932 and/or experimental subset representation 932, for example. Of course, the particular types of subsets and/or the particular directives mentioned and/or illustrated are merely examples, and subject matter is not limited in scope in these respects.

Figure 10:
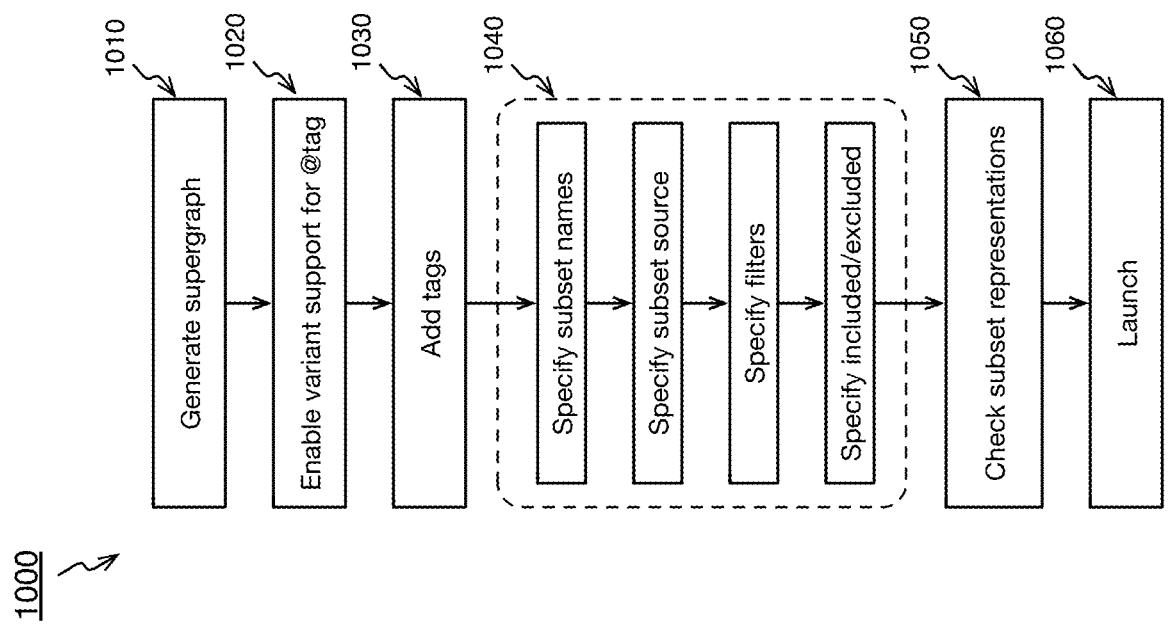
FIG. 10 is an illustration depicting an example process for generating subset representations of a supergraph, in accordance with an embodiment.

FIG. 10 is an illustration depicting an embodiment 1000 of a process for generating subset representations of a supergraph. Embodiments may include all of the operations, processes, techniques, approaches, etc. described, fewer than the operations, processes, techniques, approaches, etc. described, and/or more than the operations, processes, techniques, approaches, etc. described in example process 1000. Likewise, it should be noted that content acquired or produced, such as, for example, input signals, output signals, operations, results, etc. associated with the example provided may be represented via one or more analog and/or digital signals and/or signal packets. It should also be appreciated that even though one or more operations, processes, techniques, approaches, etc. are illustrated or described concurrently or with respect to a certain sequence, other sequences or concurrent operations, processes, techniques, approaches, etc. may be employed. Further, it should be noted that operations, processes, techniques, approaches, etc. may be implemented, performed, etc. by any combination of hardware, firmware and/or software. In addition, although the description below references particular aspects and/or features illustrated in certain other FIGURES, one or more operations, processes, techniques, approaches, etc. may be performed with other aspects and/or features.

As indicated at block 1010, a unified graph, such as a GraphQL supergraph, may be generated and/or otherwise obtained. As discussed previously, a supergraph may be composed from one or more subgraphs, for example.

As further indicated at block 1020, a particular variant may be enabled to support @tag directives, for example. "Variant" and/or the like in this context refers to different instances of a particular graph running in different environments (e.g., staging and/or production). Thus, in some circumstances, multiple instances of a particular graph may exist concurrently. It may be advantageous to be able to specify a particular instance, or variant, of a particular graph to enable for @tag support, for example.

In implementations, a @tag directive may be added to particular schema elements of a supergraph, for example, to indicate whether to include or exclude the particular schema elements from subset representations of the supergraph. An example "Products" subgraph schema is provided below:
Products Subgraph

```
# Include this definition in any schema with tags!
directive @tag(name: String!) repeatable on
    | FIELD_DEFINITION
    | INTERFACE
    | OBJECT
    | UNION
type Query {
    topProducts: [Product!]! @tag(name: "partner")
}
# All fields of the Product object type automatically inherit
# the "partner" tag to avoid having to tag them individually
type Product @key(fields: "upc") @tag(name: "partner") {
    upc: ID!
    name: String!
    description: String!
    # These fields also inherit the "partner" tag. You can
    # prevent access to them by defining an excludes filter in Studio
    internalId: ID! @tag(name: "internal")
    percentageMatch: Float! @tag(name: "experimental")
}
```

Based at least in part on the example subgraph schema provided above, the @tag directive may be applied to the Product object type, to the Query.topProducts field (e.g., which returns a list of Product elements), and/or to the two fields of Product: internalId and percentageMatch. In implementations, individual tags may have a string name. Schema elements tagged with the same string name may be included or excluded as a group by a particular subset representation, in an implementation. Also, for example, a supergraph schema generated from one or more subgraphs may retain the @tag directives (e.g., all of the @tag directives) specified in the subgraphs.

In an implementation, @tag directives (and/or other similar specified directives) may be applied to fields of types and/or may be applied to definitions of types, for example. In implementations, tag names may include alphanumeric characters and/or may also include hyphen and/or forward slash characters. Of course, subject matter is not limited in scope in these respects. Also, in implementations, whenever an type definition is tagged, fields that return that type may also be tagged. In implementations, this may be accomplished manually (e.g., via input obtained from one or more users via a computing device and/or the like), for example, although other implementations may accomplish this programmatically (e.g., via operations executed by a processor of a computing device and/or the like). For circumstances in which fields that return a tagged type are not also similarly tagged, a subset representation may exclude a type while including fields that return it, for example, which may result in an invalid subset representation. Further, in an implementation, whenever a particular type is tagged, those tags may be propagated to fields of that type, for example.

In implementations, special cases may exist for adding @tag directives and/or the like to a subgraphs (and/or to supergraphs), for example. Of course, the particular special cases mentioned herein are merely examples, and subject matter is not limited in scope in these respects. In implementations, if a subset representation excludes every field of a particular type, the entire type definition may be excluded from the subset representation. Further, in an implementation, if a subset representation excludes a particular type, for example, it may also exclude all schema fields that return that type. Otherwise, generation of the subset representation fails, for example. Also, in implementations, if a subset representation includes particular types, for example, without an included tag, the types may remain accessible. In implementations, if a subset representation excludes an object that implements an interface or is included in a union, then the subset representation may not exclude schema fields that return that interface or union, for example. However, if a subgraph resolves one of these fields by returning the excluded object, a runtime error may occur in the gateway and the operation may fail, for example. Also, in implementations, one may exclude object fields that are used in a computed field's @requires directive without causing runtime errors. Additionally, tags on objects and interface types (including tags on extension types) may be inherited by all fields of that type, for example.

As mentioned, @tag directives may be supported for schema elements including, but not limited to, object types, object fields, interface types, interface fields and/or union types, for example. In implementations, an "@inaccessible" tag may also be supported. In implementations, @inaccessible directives may be supported for object types, object fields, interface types, interface fields and/or union types, to name a few non-limiting examples. In implementations, a number of transforms may be performed during filtering operations for subset representations. For example, an "add-DirectiveDefinitionsIfNotPresent" transform may add core specification declarations (and directive definitions) for @tag and/or @inaccessible if they aren't present. If @tag and/or @inaccessible are present, these particular declarations/definitions may be validated, for example. Also, in an implementation, a "directiveDefinitionLocationAugmenting" transform may augment existing directive definitions for @tag and/or @inaccessible to have a full set of permitted locations (e.g., OBJECT, INTERFACE, UNION, and/or FIELD_DEFINITION). Also, for example, a "taginheriting" transform may add tags to an object/interface field if they are on the parent type and are not already found on the particular field.

In implementations, a "tagMatching" transform may include, for each schema element that may be marked @inaccessible: look at its tags and if any tags are excluded, then mark the element as @inaccessible. Also, if no tags are included and there's at least one included filter, then mark the element @inaccessible (may be skipped if the element is an object/interface type, in implementations). Also, for example, a "partialInterfaceMasking" transform may include: if all of an interface field's implementing object fields are effectively inaccessible (either it or its parent type is marked @inaccessible), then mark the interface field @inaccessible. For circumstances in which there are no implementing object fields at all, the interface field is not marked @inaccessible, for example. Further, an "emptyObjectAndInterfaceMasking" transform may include: if all of an object/interface's fields are @inaccessible, then mark the object/interface @inaccessible. Additionally, for example, for an "emptyUnionMasking" transform, if all of a union's members are @inaccessible, then mark the union @inaccessible.

Returning to example process 1000, a subset representation may be generated, as indicated at block 1040. For example, one or more subset representation names may be specified by a user. A user may also indicate a source (e.g., supergraph schema) to be utilized to generate the one or more subset representations. In implementations, a user interface (e.g., command line interface, graphical user interface, etc.) may be provided on a computing device and/or the like to obtain such inputs from one or more users.

Figure 11:
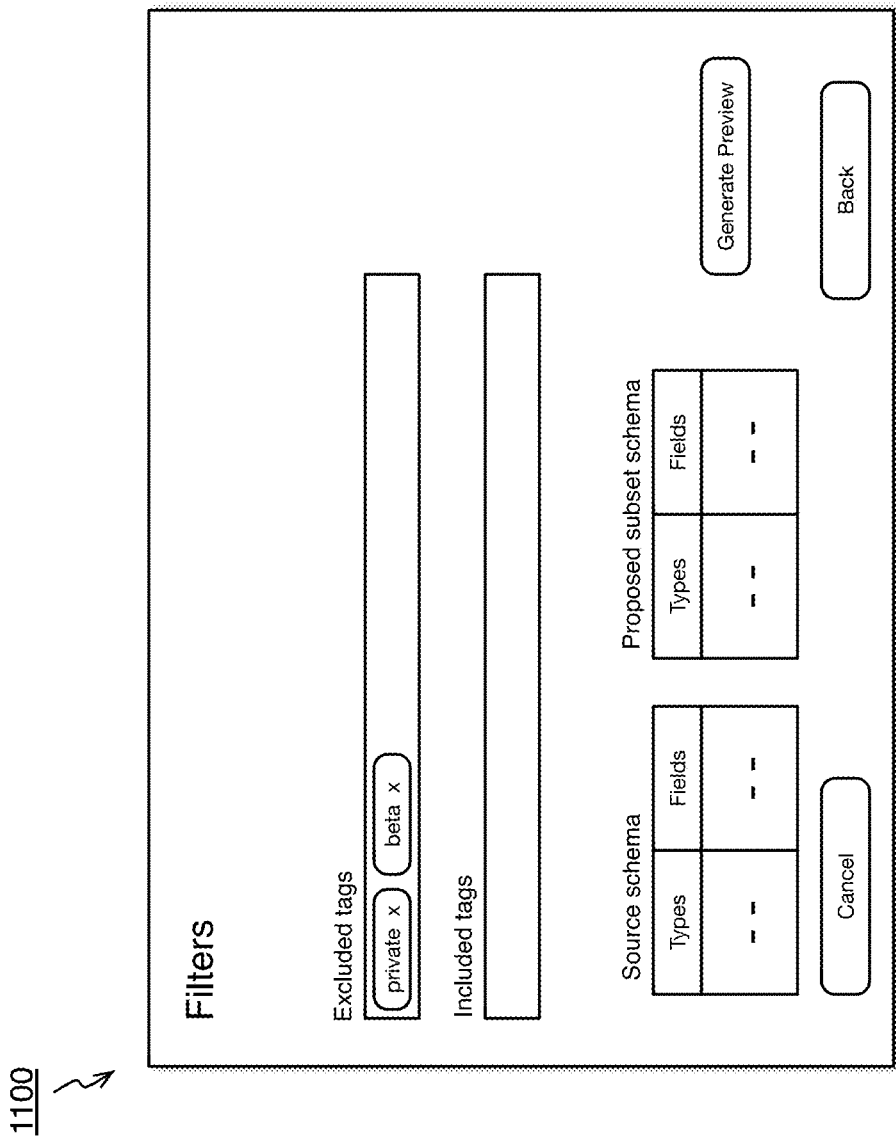
FIG. 11 depicts an example user interface for specifying filters for subset representations of a source graph, in accordance with an embodiment.

As also indicated at block 1040, one or more filters may be specified. FIG. 11 depicts an example user interface 1100. For the example of FIG. 11, user interface 1100 may comprise a graphical user interface. However, subject matter is not limited in scope in this respect. For example, implementations may provide a command line interface to obtain inputs from a user. In an implementation, "Excluded tags" and "Included tags" fields of user interface 1100 may comprise drop-down lists, although subject matter is not limited in scope in these respects. In an implementation, system 900, for example, may detect tag names (e.g., all tag names) that are used in the source supergraph schema (e.g., originating in one or more subgraphs) and/or may populate the dropdown lists with those names, as appropriate. User interface 1100 may also allow a user to specify one or more "excluded" tags and/or one or more "included" tags and/or to remove one or more tags. In an implementation, a user may add tag names that are not yet present in the source supergraph schema. If tags with those names are later added (e.g., to one or more subgraphs), system 900 may remember the user-specified tag names and may honor them in generating subsequent subset representations, for example.

In implementations, system 900, for example, may filter schema elements from the source supergraph to generate one or more subset representations according to example rules. For example, for circumstances in which the "Included tags" list is empty, system 900, for example, may include each type and/or field in a subset representation unless it is tagged with an "excluded" tag. Also, in an implementation, for circumstances in which the "Included tags" list is not empty, system 900, for example, may exclude each schema element from the subset representation unless its tagged with an "included" tag. Further, each object and/or interface type, for example, may be included in a subset representation responsive at least in part to one of its fields being included unless the type is explicitly excluded. In an implementation, system 900, for example, may exclude a type and/or field from the subset representation responsive at least in part to the type and/or field being tagged with both an "included" tag and an "excluded" tag.

In implementations, user interface 1100 may include "types" and "fields" fields under "source schema" and "proposed subset schema" headings. In an implementation, these example fields may provide a "before" and "after" look at the numbers of types and fields elements that may be impacted from changes to the "included" and/or "excluded" tag lists. For example, the "types" and "fields" entries below the "source schema" heading in user interface 1100 may indicate a number of types and/or a number of fields that may be included in a source graph schema. Also, for example, the "types" and "fields" entries below the "proposed subset schema" heading in user interface 1100 may indicate a number of types and/or a number of fields that may be included in a resulting subset representation based on the filters listed in the "included" and/or "excluded" tag lists. In this manner, a user may have some indication of at least some of the impact that various changes to the tag lists may have in substantially and/or nearly real-time (e.g., as, or shortly after, the user adjusts the tag lists).

In implementations, upon completion of adding and/or removing tag names from the "included" and/or "excluded" lists, a user may select a "generate preview" button on the user interface. At least in part in response to the user specifying to generate a preview, system 900, for example, may generate a subset representation based at least in part on the specified "included" and/or "excluded" tags. In an implementation, a visual representation of the resulting subset representation may be displayed to the user.

Returning again to example process 1000, one or more checks may be performed on a generated subset representation, as indicated at block 1050, for example. In an implementation, such checks may be performed at least in part in response to the user indicating to generate the preview. In implementations, the visual representation of the subset representation may include color-coding that may indicate to the user which aspects of the subset representation have been modified, for example. The user may visually inspect the generated preview and/or may make changes to the filters as deemed necessary and/or advantageous by the user.

Further, as indicated at block 1060, subsequent to completion of the various checks, the generated subset representation may be launched (e.g., intended audience may gain access to subset representation). As mentioned, subset representations may comprise documentation-type subset representations and/or may comprise deployed subset representations, in implementations.

Although the example discussed above describes generating a subset representation, subset representations may be modified in much a similar manner. For example, a user may edit lists of "included" and/or "excluded" tags, in an implementation.

Figure 12:
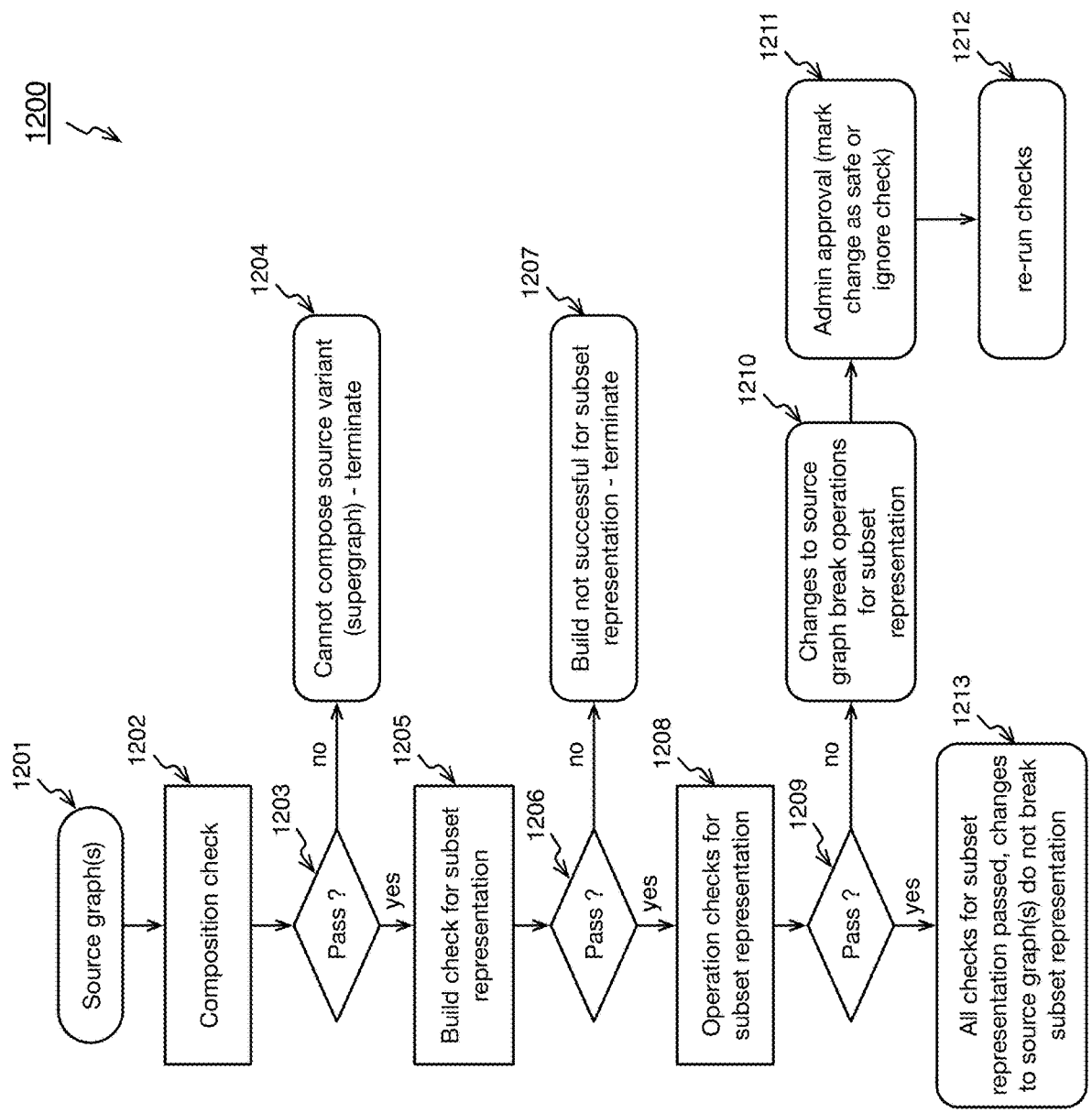
FIG. 12 is an illustration depicting an example process for performing checks on subset representations of a supergraph, in accordance with an embodiment.

FIG. 12 is an illustration depicting an embodiment 1200 of an example process for performing checks on subset representations of a supergraph. Embodiments may include all of the operations, processes, techniques, approaches, etc. described, fewer than the operations, processes, techniques, approaches, etc. described, and/or more than the operations, processes, techniques, approaches, etc. described for example process 1200. Likewise, it should be noted that content acquired or produced, such as, for example, input signals, output signals, operations, results, etc. associated with the example provided may be represented via one or more analog and/or digital signals and/or signal packets. It should also be appreciated that even though one or more operations, processes, techniques, approaches, etc. are illustrated or described concurrently or with respect to a certain sequence, other sequences or concurrent operations, processes, techniques, approaches, etc. may be employed. Further, it should be noted that operations, processes, techniques, approaches, etc. may be implemented, performed, etc. by any combination of hardware, firmware and/or software. In addition, although the description below references particular aspects and/or features illustrated in certain other FIGURES, one or more operations, processes, techniques, approaches, etc. may be performed with other aspects and/or features.

In implementations, checks indicated in example process 1200, for example, may help prevent unintended breakage of downstream (e.g., subsequent) subset representations when making changes to source subgraphs. For example, by performing one or more checks, such as those indicated in example process 1200, adverse impacts to downstream subset representations may be detected ahead of time, thereby allowing operations to continue as intended, such as smoothly and/or without user-facing errors, process interruptions, terminations, or the like. Further, such checks may help ensure that filtering rules do not impact subset representation builds and/or operations. Also, such checks may help administrators manage subset representations with increased peace-of-mind and/or with increased reliability, for example.

As indicated, one or more source graphs 1201 (e.g., subgraph schemas) may undergo composition checks at block 1202. In an implementation, a composition check operation may determine whether source subgraphs, for example, may be successfully composed into a supergraph. In implementations, as indicated at least in part at block 1203, an indication that the source subgraph(s) may be successfully composed into a supergraph may result in example process 1200 proceeding to block 1205. However, an indication that the source subgraph(s) cannot be successfully composed into a supergraph may result in a termination of example process 1200, as indicated at block 1204. Further, in implementations, failure of a composition check may additionally indicate that source graph(s) operation checks have not been performed and/or that subset representation checks have not been performed.

As indicated at block 1205, a check may be performed to determine whether a specified subset representation may be successfully generated from the supergraph, which in some instances may be determined via a build check, for example, as discussed in greater detail below. Thus, in implementations, a build check may, for example, help ensure that subset representations can be built and/or that filtering rules will work as specified. As indicated, at least in part, at block 1206, a successful build check may allow example process 1200 to proceed to block 1208. In implementations, example process 1200 may be blocked from proceeding only in circumstances in which the build check did not pass. However, as indicated at block 1207, failure of the build check may indicate that a specified subset representation may not be successfully generated from the supergraph. A failure of the build check may further indicate that the source graph(s) composition check passed (see block 1202). That is, block 1207 may indicate a successful composition check and a failed build check, for example. In an implementation, failure of the build check may result in termination of process 1200, for example.

In an implementation, operation checks may be performed on a generated subset representation, as indicated at block 1208. In implementations, an operation check may compare proposed schema changes against historical operation content (e.g., content representative of queries run by one or more clients over a period of time) to determine whether changes to the source graph(s) may have a negative impact to active and/or future clients, for example.

In implementations, operation checks 1208 and build check 1205 may be performed substantially concurrently, although subject matter is not limited in scope in this respect. For example, FIG. 12 depicts a sequential performance of operation checks 1208 and build check 1205. As indicated, at least in part, at block 1209, a successful operation check may allow example process 1200 to proceed to block 1213. However, as indicated at block 1210, failure of the operation checks may indicate that changes to the source graph(s) (e.g., subgraphs) may break one or more operations historically known to be performed by one or more client computing devices. A failure of the operation checks may further indicate that the source graph(s) composition check operation passed (see block 1202). That is, block 1210 may indicate a successful composition check and a failed operation check, for example. In an implementation, failure of the operation check(s) may result in termination of process 1200, for example.

As further indicated at block 1211, responsive at least in part to a failure of the operation check(s), a user, such as an administrator, may analyze the mode of failure and/or may indicate one or more particular changes as safe and/or may indicate to ignore particular checks, for example. In an implementation, the various checks of example process 1200 may be re-run responsive at least in part to admin/user input.

In implementations, successful completion of the operation check(s) may indicate that the specified subset representation has passed all of the specified checks, and/or that the changes to the source graph(s) (e.g., subgraphs) do not break the resulting subset representation.

Figure 13:
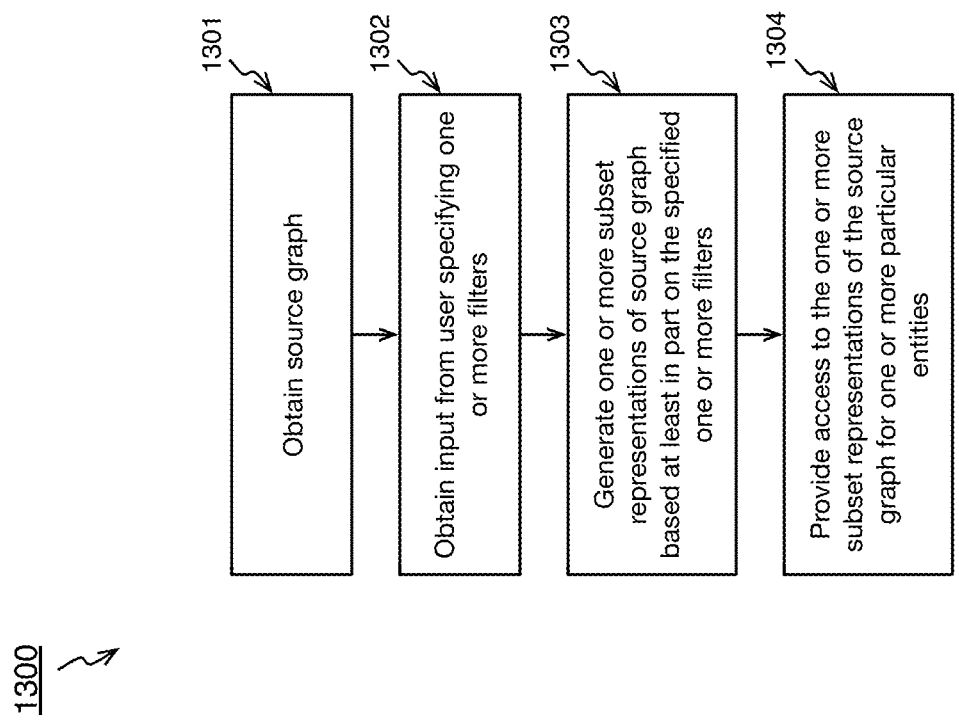
FIG. 13 is an illustration depicting an example process for generating subset representations of a supergraph, in accordance with an embodiment.

FIG. 13 is an illustration depicting an embodiment 1300 of an example process for generating subset representations of a supergraph. Embodiments may include all of the operations, processes, techniques, approaches, etc. described, fewer than the operations, processes, techniques, approaches, etc. described, and/or more than the operations, processes, techniques, approaches, etc. described for example process 1300. Likewise, it should be noted that content acquired or produced, such as, for example, input signals, output signals, operations, results, etc. associated with the example provided may be represented via one or more analog and/or digital signals and/or signal packets. It should also be appreciated that even though one or more operations, processes, techniques, approaches, etc. are illustrated or described concurrently or with respect to a certain sequence, other sequences or concurrent operations, processes, techniques, approaches, etc. may be employed. Further, it should be noted that operations, processes, techniques, approaches, etc. may be implemented, performed, etc. by any combination of hardware, firmware and/or software. In addition, although the description below references particular aspects and/or features illustrated in certain other FIGURES, one or more operations, processes, techniques, approaches, etc. may be performed with other aspects and/or features.

Generally, example process 1300 may summarize a number of previously-discussed aspects of various implementations. As indicated at block 1301, a source graph may be obtained. For example, a source graph may comprise a unified graph, such as a supergraph. In implementations, a source graph may be generated based at least in part on one or more subgraphs, for example. Updates to a source graph may be made at least in part by updating the one or more subgraphs, in an implementation.

Further, as indicated at block 1302, input may be obtained from a user, wherein the input may specify one or more filters to apply to the source graph, for example. In implementations, as indicated at block 1303, one or more subset representations of the source graph may be generated, as indicated at block 1304. In implementations, the subset representations may be generated based, at least in part, on the specified one or more filters. Further, for example, access may be provided to the one or more subset representations for one or more particular entities. As mentioned, access may be provided as documentation-type subset representations and/or as deployed subset representations.

In the context of the present patent application, the term "connection," the term "component" and/or similar terms are intended to be physical, but are not necessarily always tangible. Whether or not these terms refer to tangible subject matter, thus, may vary in a particular context of usage. As an example, a tangible connection and/or tangible connection path may be made, such as by a tangible, electrical connection, such as an electrically conductive path comprising metal or other conductor, that is able to conduct electrical current between two tangible components. Likewise, a tangible connection path may be at least partially affected and/or controlled, such that, as is typical, a tangible connection path may be open or closed, at times resulting from influence of one or more externally derived signals, such as external currents and/or voltages, such as for an electrical switch. Non-limiting illustrations of an electrical switch include a transistor, a diode, etc. However, a "connection" and/or "component," in a particular context of usage, likewise, although physical, can also be non-tangible, such as a connection between a client and a server over a network, particularly a wireless network, which generally refers to the ability for the client and server to transmit, receive, and/or exchange communications, as discussed in more detail later.

In a particular context of usage, such as a particular context in which tangible components are being discussed, therefore, the terms "coupled" and "connected" are used in a manner so that the terms are not synonymous. Similar terms may also be used in a manner in which a similar intention is exhibited. Thus, "connected" is used to indicate that two or more tangible components and/or the like, for example, are tangibly in direct physical contact. Thus, using the previous example, two tangible components that are electrically connected are physically connected via a tangible electrical connection, as previously discussed. However, "coupled," is used to mean that potentially two or more tangible components are tangibly in direct physical contact. Nonetheless, "coupled" is also used to mean that two or more tangible components and/or the like are not necessarily tangibly in direct physical contact, but are able to co-operate, liaise, and/or interact, such as, for example, by being "optically coupled." Likewise, the term "coupled" is also understood to mean indirectly connected. It is further noted, in the context of the present patent application, since memory, such as a memory component and/or memory states, is intended to be non-transitory, the term physical, at least if used in relation to memory necessarily implies that such memory components and/or memory states, continuing with the example, are tangible.

Additionally, in the present patent application, in a particular context of usage, such as a situation in which tangible components (and/or similarly, tangible materials) are being discussed, a distinction exists between being "on" and being "over." As an example, deposition of a substance "on" a substrate refers to a deposition involving direct physical and tangible contact without an intermediary, such as an intermediary substance, between the substance deposited and the substrate in this latter example; nonetheless, deposition "over" a substrate, while understood to potentially include deposition "on" a substrate (since being "on" may also accurately be described as being "over"), is understood to include a situation in which one or more intermediaries, such as one or more intermediary substances, are present between the substance deposited and the substrate so that the substance deposited is not necessarily in direct physical and tangible contact with the substrate.

A similar distinction is made in an appropriate particular context of usage, such as in which tangible materials and/or tangible components are discussed, between being "beneath" and being "under." While "beneath," in such a particular context of usage, is intended to necessarily imply physical and tangible contact (similar to "on," as just described), "under" potentially includes a situation in which there is direct physical and tangible contact, but does not necessarily imply direct physical and tangible contact, such as if one or more intermediaries, such as one or more intermediary substances, are present. Thus, "on" is understood to mean "immediately over" and "beneath" is understood to mean "immediately under."

It is likewise appreciated that terms such as "over" and "under" are understood in a similar manner as the terms "up," "down," "top," "bottom," and so on, previously mentioned. These terms may be used to facilitate discussion, but are not intended to necessarily restrict scope of claimed subject matter. For example, the term "over," as an example, is not meant to suggest that claim scope is limited to only situations in which an embodiment is right side up, such as in comparison with the embodiment being upside down, for example. An example includes a flip chip, as one illustration, in which, for example, orientation at various times (e.g., during fabrication) may not necessarily correspond to orientation of a final product. Thus, if an object, as an example, is within applicable claim scope in a particular orientation, such as upside down, as one example, likewise, it is intended that the latter also be interpreted to be included within applicable claim scope in another orientation, such as right side up, again, as an example, and vice-versa, even if applicable literal claim language has the potential to be interpreted otherwise. Of course, again, as always has been the case in the specification of a patent application, particular context of description and/or usage provides helpful guidance regarding reasonable inferences to be drawn.

Unless otherwise indicated, in the context of the present patent application, the term "or" if used to associate a list, such as A, B, or C, is intended to mean A, B, and C, here used in the inclusive sense, as well as A, B, or C, here used in the exclusive sense. With this understanding, "and" is used in the inclusive sense and intended to mean A, B, and C; whereas "and/or" can be used in an abundance of caution to make clear that all of the foregoing meanings are intended, although such usage is not required. In addition, the term "one or more" and/or similar terms is used to describe any feature, structure, characteristic, and/or the like in the singular, "and/or" is also used to describe a plurality and/or some other combination of features, structures, characteristics, and/or the like. Likewise, the term "based on" and/or similar terms are understood as not necessarily intending to convey an exhaustive list of factors, but to allow for existence of additional factors not necessarily expressly described.

Furthermore, it is intended, for a situation that relates to implementation of claimed subject matter and is subject to testing, measurement, and/or specification regarding degree, that the particular situation be understood in the following manner. As an example, in a given situation, assume a value of a physical property is to be measured. If alternatively reasonable approaches to testing, measurement, and/or specification regarding degree, at least with respect to the property, continuing with the example, is reasonably likely to occur to one of ordinary skill, at least for implementation purposes, claimed subject matter is intended to cover those alternatively reasonable approaches unless otherwise expressly indicated. As an example, if a plot of measurements over a region is produced and implementation of claimed subject matter refers to employing a measurement of slope over the region, but a variety of reasonable and alternative techniques to estimate the slope over that region exist, claimed subject matter is intended to cover those reasonable alternative techniques unless otherwise expressly indicated.

To the extent claimed subject matter is related to one or more particular measurements, such as with regard to physical manifestations capable of being measured physically, such as, without limit, temperature, pressure, voltage, current, electromagnetic radiation, etc., it is believed that claimed subject matter does not fall within the abstract idea judicial exception to statutory subject matter. Rather, it is asserted, that physical measurements are not mental steps and, likewise, are not abstract ideas.

It is noted, nonetheless, that a typical measurement model employed is that one or more measurements may respectively comprise a sum of at least two components. Thus, for a given measurement, for example, one component may comprise a deterministic component, which in an ideal sense, may comprise a physical value (e.g., sought via one or more measurements), often in the form of one or more signals, signal samples and/or states, and one component may comprise a random component, which may have a variety of sources that may be challenging to quantify. At times, for example, lack of measurement precision may affect a given measurement. Thus, for claimed subject matter, a statistical or stochastic model may be used in addition to a deterministic model as an approach to identification and/or prediction regarding one or more measurement values that may relate to claimed subject matter.

For example, a relatively large number of measurements may be collected to better estimate a deterministic component. Likewise, if measurements vary, which may typically occur, it may be that some portion of a variance may be explained as a deterministic component, while some portion of a variance may be explained as a random component. Typically, it is desirable to have stochastic variance associated with measurements be relatively small, if feasible. That is, typically, it may be preferable to be able to account for a reasonable portion of measurement variation in a deterministic manner, rather than a stochastic matter as an aid to identification and/or predictability.

Along these lines, a variety of techniques have come into use so that one or more measurements may be processed to better estimate an underlying deterministic component, as well as to estimate potentially random components. These techniques, of course, may vary with details surrounding a given situation. Typically, however, more complex problems may involve use of more complex techniques. In this regard, as alluded to above, one or more measurements of physical manifestations may be modelled deterministically and/or stochastically. Employing a model permits collected measurements to potentially be identified and/or processed, and/or potentially permits estimation and/or prediction of an underlying deterministic component, for example, with respect to later measurements to be taken. A given estimate may not be a perfect estimate; however, in general, it is expected that on average one or more estimates may better reflect an underlying deterministic component, for example, if random components that may be included in one or more obtained measurements, are considered. Practically speaking, of course, it is desirable to be able to generate, such as through estimation approaches, a physically meaningful model of processes affecting measurements to be taken.

In some situations, however, as indicated, potential influences may be complex. Therefore, seeking to understand appropriate factors to consider may be particularly challenging. In such situations, it is, therefore, not unusual to employ heuristics with respect to generating one or more estimates. Heuristics refers to use of experience related approaches that may reflect realized processes and/or realized results, such as with respect to use of historical measurements, for example. Heuristics, for example, may be employed in situations where more analytical approaches may be overly complex and/or nearly intractable. Thus, regarding claimed subject matter, an innovative feature may include, in an example embodiment, heuristics that may be employed, for example, to estimate and/or predict one or more measurements.

It is further noted that the terms "type" and/or "like," if used, such as with a feature, structure, characteristic, and/or the like, using "optical" or "electrical" as simple examples, means at least partially of and/or relating to the feature, structure, characteristic, and/or the like in such a way that presence of minor variations, even variations that might otherwise not be considered fully consistent with the feature, structure, characteristic, and/or the like, do not in general prevent the feature, structure, characteristic, and/or the like from being of a "type" and/or being "like," (such as being an "optical-type" or being "optical-like," for example) if the minor variations are sufficiently minor so that the feature, structure, characteristic, and/or the like would still be considered to be substantially present with such variations also present. Thus, continuing with this example, the terms optical-type and/or optical-like properties are necessarily intended to include optical properties. Likewise, the terms electrical-type and/or electrical-like properties, as another example, are necessarily intended to include electrical properties. It should be noted that the specification of the present patent application merely provides one or more illustrative examples and claimed subject matter is intended to not be limited to one or more illustrative examples; however, again, as has always been the case with respect to the specification of a patent application, particular context of description and/or usage provides helpful guidance regarding reasonable inferences to be drawn.

With advances in technology, it has become more typical to employ distributed computing and/or communication approaches in which portions of a process, such as signal processing of signal samples, for example, may be allocated among various devices, including one or more client devices and/or one or more server devices, via a computing and/or communications network, for example. A network may comprise two or more devices, such as network devices and/or computing devices, and/or may couple devices, such as network devices and/or computing devices, so that signal communications, such as in the form of signal packets and/or signal frames (e.g., comprising one or more signal samples), for example, may be exchanged, such as between a server device and/or a client device, as well as other types of devices, including between wired and/or wireless devices coupled via a wired and/or wireless network, for example.

An example of a distributed computing system comprises the so-called Hadoop distributed computing system, which employs a map-reduce type of architecture. In the context of the present patent application, the terms map-reduce architecture and/or similar terms are intended to refer to a distributed computing system implementation and/or embodiment for processing and/or for generating larger sets of signal samples employing map and/or reduce operations for a parallel, distributed process performed over a network of devices. A map operation and/or similar terms refer to processing of signals (e.g., signal samples) to generate one or more key-value pairs and to distribute the one or more pairs to one or more devices of the system (e.g., network). A reduce operation and/or similar terms refer to processing of signals (e.g., signal samples) via a summary operation (e.g., such as counting the number of students in a queue, yielding name frequencies, etc.). A system may employ such an architecture, such as by marshaling distributed server devices, executing various tasks in parallel, and/or managing communications, such as signal transfers, between various parts of the system (e.g., network), in an embodiment. As mentioned, one non-limiting, but well-known, example comprises the Hadoop distributed computing system. It refers to an open source implementation and/or embodiment of a map-reduce type architecture (available from the Apache Software Foundation, 1901 Munsey Drive, Forrest Hill, MD, 21050-2747), but may include other aspects, such as the Hadoop distributed file system (HDFS) (available from the Apache Software Foundation, 1901 Munsey Drive, Forrest Hill, MD, 21050-2747). In general, therefore, "Hadoop" and/or similar terms (e.g., "Hadoop-type," etc.) refer to an implementation and/or embodiment of a scheduler for executing larger processing jobs using a map-reduce architecture over a distributed system. Furthermore, in the context of the present patent application, use of the term "Hadoop" is intended to include versions, presently known and/or to be later developed.

In the context of the present patent application, the term network device refers to any device capable of communicating via and/or as part of a network and may comprise a computing device. While network devices may be capable of communicating signals (e.g., signal packets and/or frames), such as via a wired and/or wireless network, they may also be capable of performing operations associated with a computing device, such as arithmetic and/or logic operations, processing and/or storing operations (e.g., storing signal samples), such as in memory as tangible, physical memory states, and/or may, for example, operate as a server device and/or a client device in various embodiments. Network devices capable of operating as a server device, a client device and/or otherwise, may include, as examples, dedicated rack-mounted servers, desktop computers, laptop computers, set top boxes, tablets, netbooks, smart phones, wearable devices, integrated devices combining two or more features of the foregoing devices, and/or the like, or any combination thereof. As mentioned, signal packets and/or frames, for example, may be exchanged, such as between a server device and/or a client device, as well as other types of devices, including between wired and/or wireless devices coupled via a wired and/or wireless network, for example, or any combination thereof. It is noted that the terms, server, server device, server computing device, server computing platform and/or similar terms are used interchangeably. Similarly, the terms client, client device, client computing device, client computing platform and/or similar terms are also used interchangeably. While in some instances, for ease of description, these terms may be used in the singular, such as by referring to a "client device" or a "server device," the description is intended to encompass one or more client devices and/or one or more server devices, as appropriate. Along similar lines, references to a "database" are understood to mean, one or more databases and/or portions thereof, as appropriate.

It should be understood that for ease of description, a network device (also referred to as a networking device) may be embodied and/or described in terms of a computing device and vice-versa. However, it should further be understood that this description should in no way be construed so that claimed subject matter is limited to one embodiment, such as only a computing device and/or only a network device, but, instead, may be embodied as a variety of devices or combinations thereof, including, for example, one or more illustrative examples.

A network may also include now known, and/or to be later developed arrangements, derivatives, and/or improvements, including, for example, past, present and/or future mass storage, such as network attached storage (NAS), a storage area network (SAN), and/or other forms of device readable media, for example. A network may include a portion of the Internet, one or more local area networks (LANs), one or more wide area networks (WANs), wire-line type connections, wireless type connections, other connections, or any combination thereof. Thus, a network may be worldwide in scope and/or extent. Likewise, sub-networks, such as may employ differing architectures and/or may be substantially compliant and/or substantially compatible with differing protocols, such as network computing and/or communications protocols (e.g., network protocols), may interoperate within a larger network.

In the context of the present patent application, the term sub-network and/or similar terms, if used, for example, with respect to a network, refers to the network and/or a part thereof. Sub-networks may also comprise links, such as physical links, connecting and/or coupling nodes, so as to be capable to communicate signal packets and/or frames between devices of particular nodes, including via wired links, wireless links, or combinations thereof. Various types of devices, such as network devices and/or computing devices, may be made available so that device interoperability is enabled and/or, in at least some instances, may be transparent. In the context of the present patent application, the term "transparent," if used with respect to devices of a network, refers to devices communicating via the network in which the devices are able to communicate via one or more intermediate devices, such as one or more intermediate nodes, but without the communicating devices necessarily specifying the one or more intermediate nodes and/or the one or more intermediate devices of the one or more intermediate nodes and/or, thus, may include within the network the devices communicating via the one or more intermediate nodes and/or the one or more intermediate devices of the one or more intermediate nodes, but may engage in signal communications as if such intermediate nodes and/or intermediate devices are not necessarily involved. For example, a router may provide a link and/or connection between otherwise separate and/or independent LANs.

In the context of the present patent application, a "private network" refers to a particular, limited set of devices, such as network devices and/or computing devices, able to communicate with other devices, such as network devices and/or computing devices, in the particular, limited set, such as via signal packet and/or signal frame communications, for example, without a need for re-routing and/or redirecting signal communications. A private network may comprise a stand-alone network; however, a private network may also comprise a subset of a larger network, such as, for example, without limitation, all or a portion of the Internet. Thus, for example, a private network "in the cloud" may refer to a private network that comprises a subset of the Internet. Although signal packet and/or frame communications (e.g. signal communications) may employ intermediate devices of intermediate nodes to exchange signal packets and/or signal frames, those intermediate devices may not necessarily be included in the private network by not being a source or designated destination for one or more signal packets and/or signal frames, for example. It is understood in the context of the present patent application that a private network may direct outgoing signal communications to devices not in the private network, but devices outside the private network may not necessarily be able to direct inbound signal communications to devices included in the private network.

The Internet refers to a decentralized global network of interoperable networks that comply with the Internet Protocol (IP). It is noted that there are several versions of the Internet Protocol. The term Internet Protocol, IP, and/or similar terms are intended to refer to any version, now known and/or to be later developed. The Internet includes local area networks (LANs), wide area networks (WANs), wireless networks, and/or long haul public networks that, for example, may allow signal packets and/or frames to be communicated between LANs. The term World Wide Web (WWW or Web) and/or similar terms may also be used, although it refers to a part of the Internet that complies with the Hypertext Transfer Protocol (HTTP). For example, network devices may engage in an HTTP session through an exchange of appropriately substantially compatible and/or substantially compliant signal packets and/or frames. It is noted that there are several versions of the Hypertext Transfer Protocol. The term Hypertext Transfer Protocol, HTTP, and/or similar terms are intended to refer to any version, now known and/or to be later developed. It is likewise noted that in various places in this document substitution of the term Internet with the term World Wide Web ("Web") may be made without a significant departure in meaning and may, therefore, also be understood in that manner if the statement would remain correct with such a substitution.

Although claimed subject matter is not in particular limited in scope to the Internet and/or to the Web; nonetheless, the Internet and/or the Web may without limitation provide a useful example of an embodiment at least for purposes of illustration. As indicated, the Internet and/or the Web may comprise a worldwide system of interoperable networks, including interoperable devices within those networks. The Internet and/or Web has evolved to a public, self-sustaining facility accessible to potentially billions of people or more worldwide. Also, in an embodiment, and as mentioned above, the terms "WWW" and/or "Web" refer to a part of the Internet that complies with the Hypertext Transfer Protocol. The Internet and/or the Web, therefore, in the context of the present patent application, may comprise a service that organizes stored digital content, such as, for example, text, images, video, etc., through the use of hypermedia, for example. It is noted that a network, such as the Internet and/or Web, may be employed to store electronic files and/or electronic documents.

The term electronic file and/or the term electronic document are used throughout this document to refer to a set of stored memory states and/or a set of physical signals associated in a manner so as to thereby at least logically form a file (e.g., electronic) and/or an electronic document. That is, it is not meant to implicitly reference a particular syntax, format and/or approach used, for example, with respect to a set of associated memory states and/or a set of associated physical signals. If a particular type of file storage format and/or syntax, for example, is intended, it is referenced expressly. It is further noted an association of memory states, for example, may be in a logical sense and not necessarily in a tangible, physical sense. Thus, although signal and/or state components of a file and/or an electronic document, for example, are to be associated logically, storage thereof, for example, may reside in one or more different places in a tangible, physical memory, in an embodiment.

A Hyper Text Markup Language ("HTML"), for example, may be utilized to specify digital content and/or to specify a format thereof, such as in the form of an electronic file and/or an electronic document, such as a Web page, Web site, etc., for example. An Extensible Markup Language ("XML") may also be utilized to specify digital content and/or to specify a format thereof, such as in the form of an electronic file and/or an electronic document, such as a Web page, Web site, etc., in an embodiment. Of course, HTML and/or XML are merely examples of "markup" languages, provided as non-limiting illustrations. Furthermore, HTML and/or XML are intended to refer to any version, now known and/or to be later developed, of these languages. Likewise, claimed subject matter are not intended to be limited to examples provided as illustrations, of course.

In the context of the present patent application, the term "Web site" and/or similar terms refer to Web pages that are associated electronically to form a particular collection thereof. Also, in the context of the present patent application, "Web page" and/or similar terms refer to an electronic file and/or an electronic document accessible via a network, including by specifying a uniform resource locator (URL) for accessibility via the Web, in an example embodiment. As alluded to above, in one or more embodiments, a Web page may comprise digital content coded (e.g., via computer instructions) using one or more languages, such as, for example, markup languages, including HTML and/or XML, although claimed subject matter is not limited in scope in this respect. Also, in one or more embodiments, application developers may write code (e.g., computer instructions) in the form of JavaScript (or other programming languages), for example, executable by a computing device to provide digital content to populate an electronic document and/or an electronic file in an appropriate format, such as for use in a particular application, for example. Use of the term "JavaScript" and/or similar terms intended to refer to one or more particular programming languages are intended to refer to any version of the one or more programming languages identified, now known and/or to be later developed. Thus, JavaScript is merely an example programming language. As was mentioned, claimed subject matter is not intended to be limited to examples and/or illustrations.

In the context of the present patent application, the terms "entry," "electronic entry," "document," "electronic document," "content,", "digital content," "item," and/or similar terms are meant to refer to signals and/or states in a physical format, such as a digital signal and/or digital state format, e.g., that may be perceived by a user if displayed, played, tactilely generated, etc. and/or otherwise executed by a device, such as a digital device, including, for example, a computing device, but otherwise might not necessarily be readily perceivable by humans (e.g., if in a digital format). Likewise, in the context of the present patent application, digital content provided to a user in a form so that the user is able to readily perceive the underlying content itself (e.g., content presented in a form consumable by a human, such as hearing audio, feeling tactile sensations and/or seeing images, as examples) is referred to, with respect to the user, as "consuming" digital content, "consumption" of digital content, "consumable" digital content and/or similar terms. For one or more embodiments, an electronic document and/or an electronic file may comprise a Web page of code (e.g., computer instructions) in a markup language executed or to be executed by a computing and/or networking device, for example. In another embodiment, an electronic document and/or electronic file may comprise a portion and/or a region of a Web page. However, claimed subject matter is not intended to be limited in these respects.

Also, for one or more embodiments, an electronic document and/or electronic file may comprise a number of components. As previously indicated, in the context of the present patent application, a component is physical, but is not necessarily tangible. As an example, components with reference to an electronic document and/or electronic file, in one or more embodiments, may comprise text, for example, in the form of physical signals and/or physical states (e.g., capable of being physically displayed). Typically, memory states, for example, comprise tangible components, whereas physical signals are not necessarily tangible, although signals may become (e.g., be made) tangible, such as if appearing on a tangible display, for example, as is not uncommon. Also, for one or more embodiments, components with reference to an electronic document and/or electronic file may comprise a graphical object, such as, for example, an image, such as a digital image, and/or sub-objects, including attributes thereof, which, again, comprise physical signals and/or physical states (e.g., capable of being tangibly displayed). In an embodiment, digital content may comprise, for example, text, images, audio, video, and/or other types of electronic documents and/or electronic files, including portions thereof, for example.

Also, in the context of the present patent application, the term parameters (e.g., one or more parameters) refer to material descriptive of a collection of signal samples, such as one or more electronic documents and/or electronic files, and exist in the form of physical signals and/or physical states, such as memory states. For example, one or more parameters, such as referring to an electronic document and/or an electronic file comprising an image, may include, as examples, time of day at which an image was captured, latitude and longitude of an image capture device, such as a camera, for example, etc. In another example, one or more parameters relevant to digital content, such as digital content comprising a technical article, as an example, may include one or more authors, for example. Claimed subject matter is intended to embrace meaningful, descriptive parameters in any format, so long as the one or more parameters comprise physical signals and/or states, which may include, as parameter examples, collection name (e.g., electronic file and/or electronic document identifier name), technique of creation, purpose of creation, time and date of creation, logical path if stored, coding formats (e.g., type of computer instructions, such as a markup language) and/or standards and/or specifications used so as to be protocol compliant (e.g., meaning substantially compliant and/or substantially compatible) for one or more uses, and so forth.

Signal packet communications and/or signal frame communications, also referred to as signal packet transmissions and/or signal frame transmissions (or merely "signal packets" or "signal frames"), may be communicated between nodes of a network, where a node may comprise one or more network devices and/or one or more computing devices, for example. As an illustrative example, but without limitation, a node may comprise one or more sites employing a local network address, such as in a local network address space. Likewise, a device, such as a network device and/or a computing device, may be associated with that node. It is also noted that in the context of this patent application, the term "transmission" is intended as another term for a type of signal communication that may occur in any one of a variety of situations. Thus, it is not intended to imply a particular directionality of communication and/or a particular initiating end of a communication path for the "transmission" communication. For example, the mere use of the term in and of itself is not intended, in the context of the present patent application, to have particular implications with respect to the one or more signals being communicated, such as, for example, whether the signals are being communicated "to" a particular device, whether the signals are being communicated "from" a particular device, and/or regarding which end of a communication path may be initiating communication, such as, for example, in a "push type" of signal transfer or in a "pull type" of signal transfer. In the context of the present patent application, push and/or pull type signal transfers are distinguished by which end of a communications path initiates signal transfer.

Thus, a signal packet and/or frame may, as an example, be communicated via a communication channel and/or a communication path, such as comprising a portion of the Internet and/or the Web, from a site via an access node coupled to the Internet or vice-versa. Likewise, a signal packet and/or frame may be forwarded via network nodes to a target site coupled to a local network, for example. A signal packet and/or frame communicated via the Internet and/or the Web, for example, may be routed via a path, such as either being "pushed" or "pulled," comprising one or more gateways, servers, etc. that may, for example, route a signal packet and/or frame, such as, for example, substantially in accordance with a target and/or destination address and availability of a network path of network nodes to the target and/or destination address. Although the Internet and/or the Web comprise a network of interoperable networks, not all of those interoperable networks are necessarily available and/or accessible to the public.

In the context of the particular patent application, a network protocol, such as for communicating between devices of a network, may be characterized, at least in part, substantially in accordance with a layered description, such as the so-called Open Systems Interconnection (OSI) seven layer type of approach and/or description. A network computing and/or communications protocol (also referred to as a network protocol) refers to a set of signaling conventions, such as for communication transmissions, for example, as may take place between and/or among devices in a network. In the context of the present patent application, the term "between" and/or similar terms are understood to include "among" if appropriate for the particular usage and vice-versa. Likewise, in the context of the present patent application, the terms "compatible with," "comply with" and/or similar terms are understood to respectively include substantial compatibility and/or substantial compliance.

A network protocol, such as protocols characterized substantially in accordance with the aforementioned OSI description, has several layers. These layers are referred to as a network stack. Various types of communications (e.g., transmissions), such as network communications, may occur across various layers. A lowest level layer in a network stack, such as the so-called physical layer, may characterize how symbols (e.g., bits and/or bytes) are communicated as one or more signals (and/or signal samples) via a physical medium (e.g., twisted pair copper wire, coaxial cable, fiber optic cable, wireless air interface, combinations thereof, etc.). Progressing to higher-level layers in a network protocol stack, additional operations and/or features may be available via engaging in communications that are substantially compatible and/or substantially compliant with a particular network protocol at these higher-level layers. For example, higher-level layers of a network protocol may, for example, affect device permissions, user permissions, etc.

A network and/or sub-network, in an embodiment, may communicate via signal packets and/or signal frames, such as via participating digital devices and may be substantially compliant and/or substantially compatible with, but is not limited to, now known and/or to be developed, versions of any of the following network protocol stacks: ARCNET, AppleTalk, ATM, Bluetooth, DECnet, Ethernet, FDDI, Frame Relay, HIPPI, IEEE 1394, IEEE 802.11, IEEE-488, Internet Protocol Suite, IPX, Myrinet, OSI Protocol Suite, QsNet, RS-232, SPX, System Network Architecture, Token Ring, USB, and/or X.25. A network and/or sub-network may employ, for example, a version, now known and/or later to be developed, of the following: TCP/IP, UDP, DECnet, NetBEUI, IPX, AppleTalk and/or the like. Versions of the Internet Protocol (IP) may include IPv4, IPv6, and/or other later to be developed versions.

Regarding aspects related to a network, including a communications and/or computing network, a wireless network may couple devices, including client devices, with the network. A wireless network may employ stand-alone, ad-hoc networks, mesh networks, Wireless LAN (WLAN) networks, cellular networks, and/or the like. A wireless network may further include a system of terminals, gateways, routers, and/or the like coupled by wireless radio links, and/or the like, which may move freely, randomly and/or organize themselves arbitrarily, such that network topology may change, at times even rapidly. A wireless network may further employ a plurality of network access technologies, including a version of Long Term Evolution (LTE), WLAN, Wireless Router (WR) mesh, 2nd, 3rd, or 4th generation (2G, 3G, 4G, or 5G) cellular technology and/or the like, whether currently known and/or to be later developed. Network access technologies may enable wide area coverage for devices, such as computing devices and/or network devices, with varying degrees of mobility, for example.

A network may enable radio frequency and/or other wireless type communications via a wireless network access technology and/or air interface, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, ultra-wideband (UWB), 802.11b/g/n, and/or the like. A wireless network may include virtually any type of now known and/or to be developed wireless communication mechanism and/or wireless communications protocol by which signals may be communicated between devices, between networks, within a network, and/or the like, including the foregoing, of course.

Figure 14:
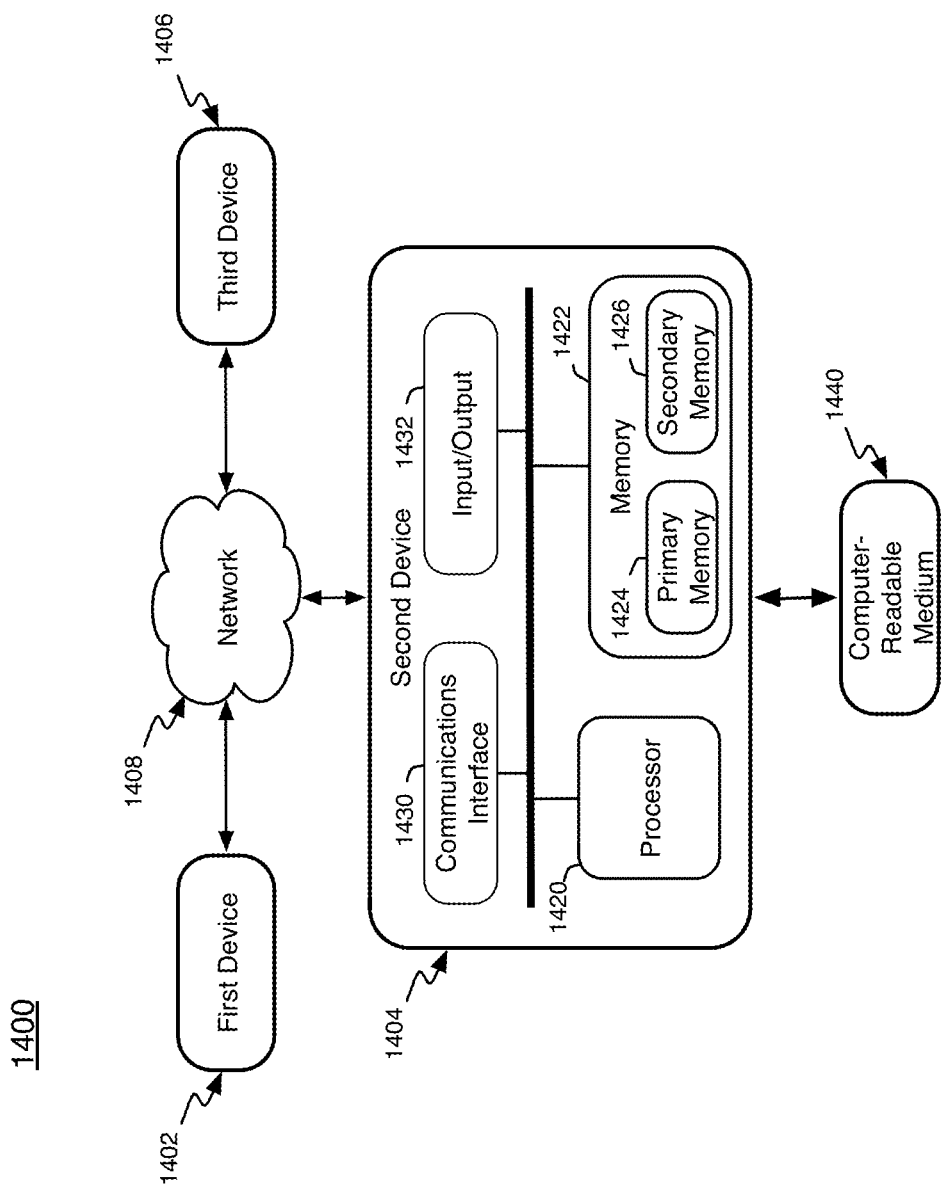
FIG. 14 depicts a schematic diagram illustrating an implementation of an example computing and/or communications environment, in accordance with an embodiment.

In one example embodiment, as shown in FIG. 14, a system embodiment may comprise a local network (e.g., device 1404 and medium 1440) and/or another type of network, such as a computing and/or communications network. For purposes of illustration, therefore, FIG. 14 shows an embodiment 1400 of a system that may be employed to implement either type or both types of networks. Network 1408 may comprise one or more network connections, links, processes, services, applications, and/or resources to facilitate and/or support communications, such as an exchange of communication signals, for example, between a computing device, such as 1402, and another computing device, such as 1406, which may, for example, comprise one or more client computing devices and/or one or more server computing device. By way of example, but not limitation, network 1408 may comprise wireless and/or wired communication links, telephone and/or telecommunications systems, Wi-Fi networks, Wi-MAX networks, the Internet, a local area network (LAN), a wide area network (WAN), or any combinations thereof.

Example devices in FIG. 14 may comprise features, for example, of a client computing device and/or a server computing device, in an embodiment. It is further noted that the term computing device, in general, whether employed as a client and/or as a server, or otherwise, refers at least to a processor and a memory connected by a communication bus. Likewise, in the context of the present patent application at least, this is understood to refer to sufficient structure within the meaning of 35 USC § 112 (f) so that it is specifically intended that 35 USC § 112 (f) not be implicated by use of the term "computing device" and/or similar terms; however, if it is determined, for some reason not immediately apparent, that the foregoing understanding cannot stand and that 35 USC § 112 (f), therefore, necessarily is implicated by the use of the term "computing device" and/or similar terms, then, it is intended, pursuant to that statutory section, that corresponding structure, material and/or acts for performing one or more functions be understood and be interpreted to be described at least in FIGS. 1-13 and in the text associated at least with the foregoing FIGURE(s) of the present patent application.

Referring now to FIG. 14, in an embodiment, first and third devices 1402 and 1406 may be capable of rendering a graphical user interface (GUI) for a network device and/or a computing device, for example, so that a user-operator may engage in system use. Device 1404 may potentially serve a similar function in this illustration. Likewise, in FIG. 14, computing device 1402 ('first device' in FIGURE) may interface with computing device 1404 ('second device' in FIGURE), which may, for example, also comprise features of a client computing device and/or a server computing device, in an embodiment. Processor (e.g., processing device) 1420 and memory 1422, which may comprise primary memory 1424 and secondary memory 1426, may communicate by way of a communication bus 1415, for example. The term "computing device," in the context of the present patent application, refers to a system and/or a device, such as a computing apparatus, that includes a capability to process (e.g., perform computations) and/or store digital content, such as electronic files, electronic documents, measurements, text, images, video, audio, sensor content, etc. in the form of signals and/or states. Thus, a computing device, in the context of the present patent application, may comprise hardware, software, firmware, or any combination thereof (other than software per se). Computing device 1404, as depicted in FIG. 14, is merely one example, and claimed subject matter is not limited in scope to this particular example.

For one or more embodiments, a device, such as a computing device and/or networking device, may comprise, for example, any of a wide range of digital electronic devices, including, but not limited to, desktop and/or notebook computers, high-definition televisions, digital versatile disc (DVD) and/or other optical disc players and/or recorders, game consoles, satellite television receivers, cellular telephones, tablet devices, wearable devices, personal digital assistants, mobile audio and/or video playback and/or recording devices, Internet of Things (IOT) type devices, endpoint and/or sensor nodes, gateway devices, or any combination of the foregoing. Further, unless specifically stated otherwise, a process as described, such as with reference to flow diagrams and/or otherwise, may also be executed and/or affected, in whole or in part, by a computing device and/or a network device. A device, such as a computing device and/or network device, may vary in terms of capabilities and/or features. Claimed subject matter is intended to cover a wide range of potential variations. For example, a device may include a numeric keypad and/or other display of limited functionality, such as a monochrome liquid crystal display (LCD) for displaying text, for example. In contrast, however, as another example, a web-enabled device may include a physical and/or a virtual keyboard, mass storage, one or more accelerometers, one or more gyroscopes, global positioning system (GPS) and/or other location-identifying type capability, and/or a display with a higher degree of functionality, such as a touch-sensitive color 2D or 3D display, for example.

As suggested previously, communications between a computing device and/or a network device and a wireless network may be in accordance with known and/or to be developed network protocols including, for example, global system for mobile communications (GSM), enhanced data rate for GSM evolution (EDGE), 802.11b/g/n/h, etc., and/or worldwide interoperability for microwave access (WiMAX). A computing device and/or a networking device may also have a subscriber identity module (SIM) card, which, for example, may comprise a detachable or embedded smart card that is able to store subscription content of a user, and/or is also able to store a contact list. It is noted, however, that a SIM card may also be electronic, meaning that is may simply be stored in a particular location in memory of the computing and/or networking device. A user may own the computing device and/or network device or may otherwise be a user, such as a primary user, for example. A device may be assigned an address by a wireless network operator, a wired network operator, and/or an Internet Service Provider (ISP). For example, an address may comprise a domestic or international telephone number, an Internet Protocol (IP) address, and/or one or more other identifiers. In other embodiments, a computing and/or communications network may be embodied as a wired network, wireless network, or any combinations thereof.

A computing and/or network device may include and/or may execute a variety of now known and/or to be developed operating systems, derivatives and/or versions thereof, including computer operating systems, such as Windows, iOS, Linux, a mobile operating system, such as iOS, Android, Windows Mobile, and/or the like. A computing device and/or network device may include and/or may execute a variety of possible applications, such as a client software application enabling communication with other devices. For example, one or more messages (e.g., content) may be communicated, such as via one or more protocols, now known and/or later to be developed, suitable for communication of email, short message service (SMS), and/or multimedia message service (MMS), including via a network, such as a social network, formed at least in part by a portion of a computing and/or communications network, including, but not limited to, Facebook, LinkedIn, Twitter, and/or Flickr, to provide only a few examples. A computing and/or network device may also include executable computer instructions to process and/or communicate digital content, such as, for example, textual content, digital multimedia content, sensor content, and/or the like. A computing and/or network device may also include executable computer instructions to perform a variety of possible tasks, such as browsing, searching, playing various forms of digital content, including locally stored and/or streamed video, and/or games such as, but not limited to, fantasy sports leagues. The foregoing is provided merely to illustrate that claimed subject matter is intended to include a wide range of possible features and/or capabilities.

In FIG. 14, computing device 1402 may provide one or more sources of executable computer instructions in the form physical states and/or signals (e.g., stored in memory states), for example. Computing device 1402 may communicate with computing device 1404 by way of a network connection, such as via network 1408, for example. As previously mentioned, a connection, while physical, may not necessarily be tangible. Although computing device 1404 of FIG. 14 shows various tangible, physical components, claimed subject matter is not limited to a computing devices having only these tangible components as other implementations and/or embodiments may include alternative arrangements that may comprise additional tangible components or fewer tangible components, for example, that function differently while achieving similar results. Rather, examples are provided merely as illustrations. It is not intended that claimed subject matter be limited in scope to illustrative examples.

Memory 1422 may comprise any non-transitory storage mechanism. Memory 1422 may comprise, for example, primary memory 1424 and secondary memory 1426, additional memory circuits, mechanisms, or combinations thereof may be used. Memory 1422 may comprise, for example, random access memory, read only memory, etc., such as in the form of one or more storage devices and/or systems, such as, for example, a disk drive including an optical disc drive, a tape drive, a solid-state memory drive, etc., just to name a few examples.

Memory 1422 may be utilized to store a program of executable computer instructions. For example, processor 1420 may fetch executable instructions from memory and proceed to execute the fetched instructions. Memory 1422 may also comprise a memory controller for accessing device readable-medium 1440 that may carry and/or make accessible digital content, which may include code, and/or instructions, for example, executable by processor 1420 and/or some other device, such as a controller, as one example, capable of executing computer instructions, for example. Under direction of processor 1420, a non-transitory memory, such as memory cells storing physical states (e.g., memory states), comprising, for example, a program of executable computer instructions, may be executed by processor 1420 and able to generate signals to be communicated via a network, for example, as previously described. Generated signals may also be stored in memory, also previously suggested.

Memory 1422 may store electronic files and/or electronic documents, such as relating to one or more users, and may also comprise a computer-readable medium that may carry and/or make accessible content, including code and/or instructions, for example, executable by processor 1420 and/or some other device, such as a controller, as one example, capable of executing computer instructions, for example. As previously mentioned, the term electronic file and/or the term electronic document are used throughout this document to refer to a set of stored memory states and/or a set of physical signals associated in a manner so as to thereby form an electronic file and/or an electronic document. That is, it is not meant to implicitly reference a particular syntax, format and/or approach used, for example, with respect to a set of associated memory states and/or a set of associated physical signals. It is further noted an association of memory states, for example, may be in a logical sense and not necessarily in a tangible, physical sense. Thus, although signal and/or state components of an electronic file and/or electronic document, are to be associated logically, storage thereof, for example, may reside in one or more different places in a tangible, physical memory, in an embodiment.

Algorithmic descriptions and/or symbolic representations are examples of techniques used by those of ordinary skill in the signal processing and/or related arts to convey the substance of their work to others skilled in the art. An algorithm is, in the context of the present patent application, and generally, is considered to be a self-consistent sequence of operations and/or similar signal processing leading to a desired result. In the context of the present patent application, operations and/or processing involve physical manipulation of physical quantities. Typically, although not necessarily, such quantities may take the form of electrical and/or magnetic signals and/or states capable of being stored, transferred, combined, compared, processed and/or otherwise manipulated, for example, as electronic signals and/or states making up components of various forms of digital content, such as signal measurements, text, images, video, audio, etc.

It has proven convenient at times, principally for reasons of common usage, to refer to such physical signals and/or physical states as bits, values, elements, parameters, symbols, characters, terms, numbers, numerals, measurements, content and/or the like. It should be understood, however, that all of these and/or similar terms are to be associated with appropriate physical quantities and are merely convenient labels. Unless specifically stated otherwise, as apparent from the preceding discussion, it is appreciated that throughout this specification discussions utilizing terms such as "processing," "computing," "calculating," "determining", "establishing", "obtaining", "identifying", "selecting", "generating", and/or the like may refer to actions and/or processes of a specific apparatus, such as a special purpose computer and/or a similar special purpose computing and/or network device. In the context of this specification, therefore, a special purpose computer and/or a similar special purpose computing and/or network device is capable of processing, manipulating and/or transforming signals and/or states, typically in the form of physical electronic and/or magnetic quantities, within memories, registers, and/or other storage devices, processing devices, and/or display devices of the special purpose computer and/or similar special purpose computing and/or network device. In the context of this particular patent application, as mentioned, the term "specific apparatus" therefore includes a general purpose computing and/or network device, such as a general purpose computer, once it is programmed to perform particular functions, such as pursuant to program software instructions.

In some circumstances, operation of a memory device, such as a change in state from a binary one to a binary zero or vice-versa, for example, may comprise a transformation, such as a physical transformation. With particular types of memory devices, such a physical transformation may comprise a physical transformation of an article to a different state or thing. For example, but without limitation, for some types of memory devices, a change in state may involve an accumulation and/or storage of charge or a release of stored charge. Likewise, in other memory devices, a change of state may comprise a physical change, such as a transformation in magnetic orientation. Likewise, a physical change may comprise a transformation in molecular structure, such as from crystalline form to amorphous form or vice-versa. In still other memory devices, a change in physical state may involve quantum mechanical phenomena, such as, superposition, entanglement, and/or the like, which may involve quantum bits (qubits), for example. The foregoing is not intended to be an exhaustive list of all examples in which a change in state from a binary one to a binary zero or vice-versa in a memory device may comprise a transformation, such as a physical, but non-transitory, transformation. Rather, the foregoing is intended as illustrative examples.

Referring again to FIG. 14, processor 1420 may comprise one or more circuits, such as digital circuits, to perform at least a portion of a computing procedure and/or process. By way of example, but not limitation, processor 1420 may comprise one or more processors, such as controllers, microprocessors, microcontrollers, application specific integrated circuits, digital signal processors, programmable logic devices, field programmable gate arrays, the like, or any combination thereof. In various implementations and/or embodiments, processor 1420 may perform signal processing, typically substantially in accordance with fetched executable computer instructions, such as to manipulate signals and/or states, to construct signals and/or states, etc., with signals and/or states generated in such a manner to be communicated and/or stored in memory, for example.

FIG. 14 also illustrates device 1404 as including a component 1432 operable with input/output devices, for example, so that signals and/or states may be appropriately communicated between devices, such as device 1404 and an input device and/or device 1404 and an output device. A user may make use of an input device, such as a computer mouse, stylus, track ball, keyboard, and/or any other similar device capable of receiving user actions and/or motions as input signals. Likewise, for a device having speech to text capability, a user may speak to a device to generate input signals. A user may make use of an output device, such as a display, a printer, etc., and/or any other device capable of providing signals and/or generating stimuli for a user, such as visual stimuli, audio stimuli and/or other similar stimuli.

In the preceding description, various aspects of claimed subject matter have been described. For purposes of explanation, specifics, such as amounts, systems and/or configurations, as examples, were set forth. In other instances, well-known features were omitted and/or simplified so as not to obscure claimed subject matter. While certain features have been illustrated and/or described herein, many modifications, substitutions, changes and/or equivalents will now occur to those skilled in the art. It is, therefore, to be understood that the appended claims are intended to cover all modifications and/or changes as fall within claimed subject matter.

What is claimed is:

1. A method, comprising:
    obtaining, at a first computing device, signals and/or states representative of a graph schema;
    storing, in a memory of the first computing device, a first data structure comprising the signals and/or states representative of the graph schema;
    obtaining, at the first computing device, signals and/or states representative of a user input specifying a first tag directive to be added to at least a first schema element of a plurality of schema elements of the graph schema, wherein the plurality of schema elements include one or more fields, definitions, interfaces, objects, or unions, or a combination thereof;
    adding, by the first computing device, the first tag directive to the at least the first schema element in accordance with the obtained user input;
    generating, by the first computing device, a second data structure comprising signals and/or states representative of a first subset representation of the graph schema at least in part by applying a filter to the signals and/or states representative of the graph schema in accordance with the first tag directive;
    deploying, via a communications network, the first subset representation of the graph schema to a gateway and/or router computing device, including storing the signals and/or states representative of the first subset representation of the graph schema in a memory of the gateway and/or router computing device;

providing visibility, via the gateway and/or router computing device, to the deployed first subset representation of the graph schema for one or more first networked computing entities;

running, via the gateway and/or router computing device, one or more queries specified by the one or more first networked computing entities directed to the deployed first subset representation of the graph schema; and denying, via the gateway and/or router computing device, access to aspects of the graph schema not included in the first subset representation of the graph schema for the one or more first networked computing entities, including blocking an attempt by the one or more first networked computing entities to query one or more of the aspects of the graph schema not included in the first subset representation of the graph schema.

2. The method of claim 1, wherein the graph schema comprises a supergraph schema, and wherein the obtaining the signals and/or states representative of the supergraph schema comprises obtaining signals and/or states representative of one or more subgraph schemas and generating the supergraph schema based, at least in part, on the one or more subgraph schemas.

3. The method of claim 2, wherein the obtaining the signals and/or states representative of the user input comprises obtaining an indication of the one or more subgraph schemas.

4. The method of claim 1, wherein the first tag directive comprises one of a plurality of tag directives.

5. The method of claim 4, further comprising obtaining, at the first computing device, an additional user input specifying one or more tag directives of the plurality of tag directives to add to an excluded tags list or to an included tags list, or a combination thereof.

6. The method of claim 1, wherein the generating the second data structure comprising signals and/or states representative of the first subset representation of the graph schema at least in part by applying the filter to the signals and/or states representative of the graph schema in accordance with the first tag directive includes generating the second data structure comprising signals and/or states representative of the first subset representation based, at least in part, on an excluded tags list or an included tags list, or a combination thereof.

7. The method of claim 1, wherein the generating the second data structure comprising signals and/or states representative of the first subset representation of the graph schema includes performing a build check to determine whether the first subset representation of the graph schema can be successfully generated from the graph schema by applying the filter to the signals and/or states representative of the graph schema in accordance with the first tag directive.

8. The method of claim 2, wherein the generating the first subset representation of the supergraph schema includes performing an operation check to determine whether one or more changes to the one or more subgraph schemas will result in an adverse impact to one or more operations to be performed by the one or more first networked computing entities with respect to the first subset representation of the graph schema.

9. The method of claim 2, wherein the generating the supergraph schema based, at least in part, on the one or more subgraph schemas comprises performing a composition check to determine whether the one or more subgraph schemas can be successfully composed into the supergraph schema.

10. The method of claim 1, wherein the denying access to aspects of the graph schema not included in the first subset representation of the graph schema for the one or more first networked computing entities comprises denying visibility into the aspects of the graph schema not included in the first subset representation of the graph schema for the one or more first networked computing entities.

11. An apparatus, comprising: at least one processor of at least one first computing device to:

obtain, at the at least one first computing device, signals and/or states representative of a graph schema;

store, in a memory of the at least one first computing device, a first data structure comprising the signals and/or states representative of the graph schema;

obtain, at the at least one first computing device, signals and/or states representative of a user input specifying a first tag directive to be added to at least a first schema element of a plurality of schema elements of the graph schema, wherein the plurality of schema elements include one or more fields, definitions, interfaces, objects, or unions, or a combination thereof;

add, by the at least one first computing device, the first tag directive to the at least the first schema element in accordance with the obtained user input;

generate, by the at least one processor of the at least one first computing device, a second data structure comprising signals and/or states representative of a first subset representation of the graph schema at least in part via an operation to filter the signals and/or states representative of the graph schema in accordance with the first tag directive;

deploy, via a communications network, the first subset representation of the graph schema to a gateway and/or router computing device, to include storage of the signals and/or states representative of the first subset representation of the graph schema in a memory of the gateway and/or router computing device;

provide visibility, via the gateway and/or router computing device, to the deployed first subset representation of the graph schema for one or more first networked computing entities;

run, via the gateway and/or router computing device, one or more queries specified by the one or more first networked computing entities directed to the deployed first subset representation of the graph schema; and deny, via the gateway and/or router computing device, access to aspects of the graph schema not included in the first subset representation of the graph schema for the one or more first networked computing entities, to include a block of an attempt by the one or more first networked computing entities to query one or more of the aspects of the graph schema not included in the first subset representation of the graph schema.

12. The apparatus of claim 11, wherein the graph schema to comprise a supergraph schema, and wherein, to obtain signals and/or states representative of the supergraph schema, the at least one processor is to obtain signals and/or states representative of one or more subgraph schemas and to generate the supergraph schema based, at least in part, on the one or more subgraph schemas.

13. The apparatus of claim 12, wherein, to obtain the signals and/or states representative of the user input, the at least one processor is to obtain signals and/or states representative of an indication of the one or more subgraph schemas.

14. The apparatus of claim 11, wherein the first tag directive to comprise one tag directive of a plurality of tag directives.

15. The apparatus of claim 14, wherein the at least one processor is to obtain, at the at least one first computing device, an additional user input specifying one or more tag directives of the plurality of tag directives to add to an excluded tags list or to an included tags list, or a combination thereof; and
wherein, to generate the second data structure comprising signals and/or states representative of the first subset representation of the graph schema, the at least one processor is to generate the second data structure comprising signals and/or states representative of the first subset representation based, at least in part, on the excluded tags list or the included tags list, or a combination thereof.

16. The apparatus of claim 11, wherein, to generate the second data structure comprising signals and/or states representative of the first subset representation of the graph schema, the at least one processor to perform a build check to determine whether the first subset representation of the graph schema can be successfully generated from the graph schema via the operation to filter the signals and/or states representative of the graph schema in accordance with the first tag directive.

17. The apparatus of claim 12, wherein, to generate the one or more subset representations of the supergraph schema, the at least one processor to perform an operation check to determine whether changes to the one or more subgraph schemas are to result in an adverse impact to one or more operations to be performed by the one or more first networked computing entities with respect to the first subset representation.

18. The apparatus of claim 12, wherein, to generate the supergraph schema based, at least in part, on the one or more subgraph schemas, the at least one processor to perform a composition check to determine whether the one or more subgraph schemas can be successfully composed into the supergraph schema, and wherein, to deny access to aspects of the graph schema not included in the first subset representation of the graph schema for the one or more first networked computing entities, the at least one processor to deny visibility into the aspects of the supergraph schema not included in the first subset representation of the graph schema for the one or more first networked computing entities.

19. An article, comprising: a non-transitory storage medium having stored thereon instructions executable by at least one processor of at least one first computing device to:

obtain, at the at least one first computing device, signals and/or states representative of a graph schema;
store, in a memory of the at least one first computing device, a first data structure comprising the signals and/or states representative of the graph schema;
obtain, at the at least one first computing device, signals and/or states representative of a user input specifying a first tag directive to be added to at least a first schema element of a plurality of schema elements of the graph schema, wherein the plurality of schema elements include one or more fields, definitions, interfaces, objects, or unions, or a combination thereof;
add, by the at least one first computing device, the first tag directive to the at least the first schema element in accordance with the obtained user input;
generate, by the at least one processor of the at least one first computing device, a second data structure comprising signals and/or states representative of a first subset representation of the graph schema at least in part via an operation to filter the signals and/or states representative of the graph schema in accordance with the first tag directive;
deploy, via a communications network, the first subset representation of the graph schema to a gateway and/or router computing device, to include storage of the signals and/or states representative of the first subset representation of the graph schema in a memory of the gateway and/or router computing device;
provide visibility, via the gateway and/or router computing device, to the deployed first subset representation of the graph schema for one or more first networked computing entities;
run, via the gateway and/or router computing device, one or more queries specified by the one or more first networked computing entities directed to the deployed first subset representation of the graph schema; and
deny, via the gateway and/or routing computing device, access to aspects of the graph schema not included in the first subset representation of the graph schema for the one or more first networked computing entities, to include a block of an attempt by the one or more first networked computing entities to query one or more of the aspects of the graph schema not included in the first subset representation of the graph schema.

20. The article of claim 19, wherein the graph schema to comprise a supergraph schema, and wherein, to obtain the supergraph schema, the at least one first computing device to obtain one or more subgraph schemas and generate the supergraph schema based, at least in part, on the one or more subgraph schemas.

* * * * *